United States Patent
Vizeu Oliveira et al.

(10) Patent No.: US 12,400,398 B2
(45) Date of Patent: Aug. 26, 2025

(54) GENERATING AND/OR DISPLAYING VIRTUAL INTERACTIONS WITH VIRTUAL OBJECTS

(71) Applicant: QUALCOMM Incorporated, San Diego, CA (US)

(72) Inventors: Lana Vizeu Oliveira, Bordeaux (FR); Laurent Ghislain Gaidon, Peujard (FR); Ludovic Rivalland, Cenon (FR); Lois Corentin Aubree, Bordeaux (FR)

(73) Assignee: QUALCOMM Incorporated, San Diego, CA (US)

(*) Notice: Subject to any disclaimer, the term of this patent is extended or adjusted under 35 U.S.C. 154(b) by 283 days.

(21) Appl. No.: 18/301,849

(22) Filed: Apr. 17, 2023

(65) Prior Publication Data

US 2024/0346751 A1    Oct. 17, 2024

(51) Int. Cl.
| | |
|---|---|
| *G06T 17/00* | (2006.01) |
| *G06F 3/01* | (2006.01) |
| *G06T 7/62* | (2017.01) |
| *G06T 7/70* | (2017.01) |
| *G06T 13/40* | (2011.01) |
| *G06V 10/74* | (2022.01) |
| *G06V 40/10* | (2022.01) |

(52) U.S. Cl.
CPC .............. *G06T 17/00* (2013.01); *G06F 3/017* (2013.01); *G06T 7/62* (2017.01); *G06T 7/70* (2017.01); *G06T 13/40* (2013.01); *G06V 10/761* (2022.01); *G06V 40/11* (2022.01); *G06T 2207/30196* (2013.01)

(58) Field of Classification Search
CPC ......... G06T 17/00; G06F 3/017; G06V 40/11; G06V 20/20
See application file for complete search history.

(56) References Cited

U.S. PATENT DOCUMENTS

| | | | | |
|---|---|---|---|---|
| 2011/0216060 A1* | 9/2011 | Weising | ............ | A63F 13/00 |
| | | | | 345/419 |
| 2013/0307875 A1* | 11/2013 | Anderson | ............ | A63F 13/92 |
| | | | | 345/633 |
| 2018/0165864 A1 | 6/2018 | Jin et al. | | |

FOREIGN PATENT DOCUMENTS

| | | |
|---|---|---|
| EP | 3183633 A1 | 6/2017 |
| JP | 2020155139 A | 9/2020 |

OTHER PUBLICATIONS

Dewez D., et al., "Do You Need Another Hand? Investigating Dual Body Representations During Anisomorphic 3D Manipulation", IEEE Transactions on Visualization and Computer Graphics, IEEE, USA, vol. 28, No. 5, May 2022, pp. 2047-2057, Feb. 15, 2022, XP011905506, figures 1-9 p. 2047, left-hand col., line 1—p. 2050, left-hand col. line 18.

(Continued)

*Primary Examiner* — Edward Martello
(74) *Attorney, Agent, or Firm* — Polsinelli LLP / QUALCOMM Incorporated

(57) ABSTRACT

Systems and techniques are described herein for displaying one or more virtual objects. For instance, a method for displaying one or more virtual objects is provided. The method may include obtaining hand-pose data indicative of a pose of a hand; obtaining virtual-object data indicative of a virtual object with which the hand is virtually interacting; and displaying a virtual hand interacting with the virtual object, the virtual hand exhibiting a virtual-hand pose based on the pose of the hand and the virtual-object data.

26 Claims, 13 Drawing Sheets

(56) References Cited

OTHER PUBLICATIONS

International Search Report and Written Opinion—PCT/US2024/018561—ISA/EPO—Jun. 17, 2024.

Prachyabrued M., et al., "Visual Feedback for Virtual Grasping", 2014 IEEE Symposium on 3D User Interfaces (3DUI), IEEE, Mar. 29, 2014, pp. 19-26, XP032586723, figures 1-6 p. 20, right-hand col. line 39—p. 23, right-hand col. line 27.

Zhang L., et al., "Using the Visuo-Haptic Illusion to Perceive and Manipulate Different Virtual Objects in Augmented Reality", IEEE Access, IEEE, USA, vol. 9, Oct. 19, 2021, pp. 143782-143794, XP011884637, Figures 1-11 abstract, p. 143782, left-hand col. line 1—p. 143788, left-hand col. line 3.

* cited by examiner

GENERATING AND/OR DISPLAYING VIRTUAL INTERACTIONS WITH VIRTUAL OBJECTS

TECHNICAL FIELD

The present disclosure generally relates to virtual interactions with virtual objects. For example, aspects of the present disclosure include systems and techniques for generating and/or displaying virtual interactions between virtual hands and virtual objects.

BACKGROUND

An extended reality (XR) (e.g., virtual reality (VR), augmented reality (AR), and/or mixed reality (MR)) system can provide a user with a virtual experience by displaying virtual content to the user). The virtual content may include a completely virtual environment (made up entirely of virtual content). Alternatively, the virtual content may provide the user with an augmented or mixed reality experience by displaying virtual content alongside with, and/or overlaid onto, a user's field of view of a real-world environment (e.g., using a see-through or pass-through XR system).

Some XR systems can facilitate interaction with XR environments. For instance, a user can use the XR system or device to interact with virtual objects in the virtual environment. In some examples, a user may play games using virtual objects (e.g., a virtual steering wheel, virtual balls, virtual sports equipment, etc.), virtually interact with other users (e.g., in a social setting, in a virtual meeting, etc.), virtually shop for items (e.g., goods, services, property, etc.), and/or experience other services in a virtual environment.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for displaying one or more virtual objects. According to at least one example, a method is provided for displaying one or more virtual objects. The method includes: obtaining hand-pose data indicative of a pose of a hand; obtaining virtual-object data indicative of a virtual object with which the hand is virtually interacting; and displaying a virtual hand interacting with the virtual object, the virtual hand exhibiting a virtual-hand pose based on the pose of the hand and the virtual-object data. In some cases, a gesture of the virtual hand may be different from a gesture of the hand.

In another example, an apparatus for displaying one or more virtual objects is provided that includes at least one memory and at least one processor (e.g., configured in circuitry) coupled to the at least one memory. The at least one processor configured to: obtain hand-pose data indicative of a pose of a hand; obtain virtual-object data indicative of a virtual object with which the hand is virtually interacting; and display a virtual hand interacting with the virtual object, the virtual hand exhibiting a virtual-hand pose based on the pose of the hand and the virtual-object data. In some cases, a gesture of the virtual hand may be different from a gesture of the hand.

In another example, a non-transitory computer-readable medium is provided that has stored thereon instructions that, when executed by one or more processors, cause the one or more processors to: obtain hand-pose data indicative of a pose of a hand; obtain virtual-object data indicative of a virtual object with which the hand is virtually interacting; and display a virtual hand interacting with the virtual object, the virtual hand exhibiting a virtual-hand pose based on the pose of the hand and the virtual-object data. In some cases, a gesture of the virtual hand may be different from a gesture of the hand.

In another example, an apparatus for displaying one or more virtual objects is provided. The apparatus includes: means for obtaining hand-pose data indicative of a pose of a hand; means for obtaining virtual-object data indicative of a virtual object with which the hand is virtually interacting; and means for displaying a virtual hand interacting with the virtual object, the virtual hand exhibiting a virtual-hand pose based on the pose of the hand and the virtual-object data. In some cases, a gesture of the virtual hand may be different from a gesture of the hand.

Systems and techniques are described for displaying one or more virtual objects. According to at least one example, a method is provided for displaying one or more virtual objects. The method includes: obtaining hand-pose data indicative of a pose of a hand; obtaining virtual-object data indicative of a virtual object with which the hand is virtually interacting; and displaying a virtual hand interacting with the virtual object, the virtual hand exhibiting a virtual-hand pose based on the pose of the hand and the virtual-object data, wherein a position of the virtual hand is delayed relative to a position of the hand based on the virtual-object data.

In another example, an apparatus for displaying one or more virtual objects is provided that includes at least one memory and at least one processor (e.g., configured in circuitry) coupled to the at least one memory. The at least one processor configured to: obtain hand-pose data indicative of a pose of a hand; obtain virtual-object data indicative of a virtual object with which the hand is virtually interacting; and display a virtual hand interacting with the virtual object, the virtual hand exhibiting a virtual-hand pose based on the pose of the hand and the virtual-object data, wherein a position of the virtual hand is delayed relative to a position of the hand based on the virtual-object data.

In another example, a non-transitory computer-readable medium is provided that has stored thereon instructions that, when executed by one or more processors, cause the one or more processors to: obtain hand-pose data indicative of a pose of a hand; obtain virtual-object data indicative of a virtual object with which the hand is virtually interacting; and display a virtual hand interacting with the virtual object, the virtual hand exhibiting a virtual-hand pose based on the pose of the hand and the virtual-object data, wherein a position of the virtual hand is delayed relative to a position of the hand based on the virtual-object data.

In another example, an apparatus for displaying one or more virtual objects is provided. The apparatus includes: means for obtaining hand-pose data indicative of a pose of a hand; means for obtaining virtual-object data indicative of a virtual object with which the hand is virtually interacting; and means for displaying a virtual hand interacting with the virtual object, the virtual hand exhibiting a virtual-hand pose based on the pose of the hand and the virtual-object data, wherein a position of the virtual hand is delayed relative to a position of the hand based on the virtual-object data.

In some aspects, one or more of the apparatuses described herein is, can be part of, or can include a mobile device (e.g., a mobile telephone or so-called "smart phone", a tablet computer, or other type of mobile device), an extended reality device (e.g., a virtual reality (VR) device, an augmented reality (AR) device, or a mixed reality (MR) device), a vehicle (or a computing device or system of a vehicle), a smart or connected device (e.g., an Internet-of-Things (IoT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
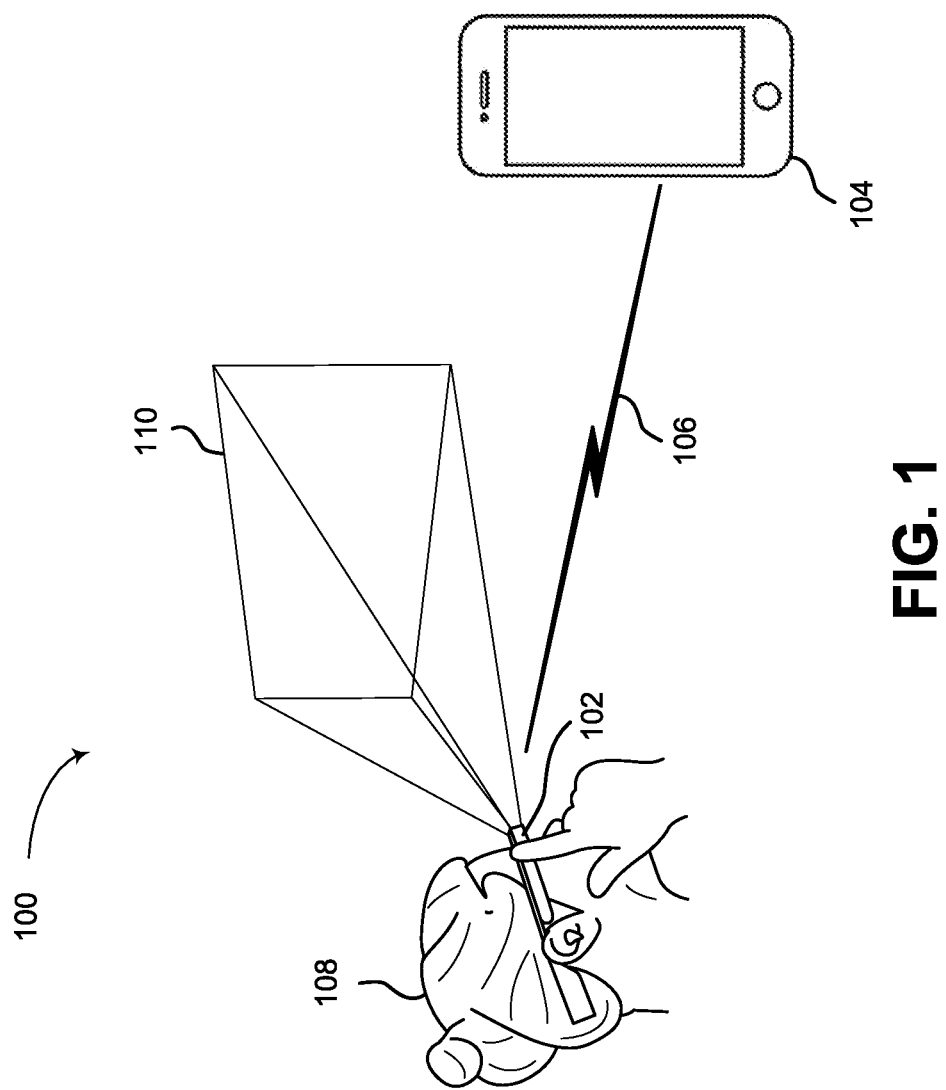
FIG. 1 is a diagram illustrating an example of an extended reality (XR) system, according to aspects of the disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

As mentioned above, extended reality (XR) (e.g., virtual reality (VR), augmented reality (AR), and/or mixed reality (MR)) system can allow a user to interact with virtual objects. For example, an XR system may include a camera that may capture images (or video) of hands of a user. The XR system may track positions of the hands (e.g., through successive images) and/or detect gestures of the hands. The XR system may take the positions and the gestures as inputs and determine desired user interactions based on the position and gestures. For example the user may reach toward a virtual object and make a pinching gesture. The XR system may interpret the reach and the pinching gestures as the user intending to grab the virtual object. In some cases, the XR system may display virtual hands grabbing the virtual object (e.g., to give the user an impression that they are holding the virtual object).

However, in some cases, a user's gesture may not match the virtual object. For example, a user may observe a virtual object as small (e.g., based on the object being distant from the user). To grab the virtual object, the user may reach with fingers to pinch the virtual object (e.g., based on the object appearing as small in the user's field of view). If the virtual object has a handle to be grasped by a hand, for example, the pinch may not match the virtual object. The mismatch between the pinch and the virtual object may detract from the virtual experience by making the virtual experience appear less real. As another example, a virtual object may simulate a heavy object. A user, not lifting an actual object, may initiate an interaction by reaching out to grab the virtual object and quickly moving the virtual object. The virtual object moving quickly, unaffected by inertia and/or gravity, may detract from the virtual experience by making the virtual experience appear less real.

Systems, apparatuses, methods (also referred to as processes), and computer-readable media (collectively referred to herein as "systems and techniques") are described herein for generating and/or displaying virtual interactions with virtual objects. For instance, the systems and techniques described herein may obtain hand-pose data (e.g., from a hand tracker) indicative of a pose of a hand. The hand-pose data may include position information indicative of a position of the hand and gesture information indicative of a gesture of the hand (e.g., a pinch, a grab, etc.). The systems and techniques may obtain virtual-object data (e.g., from a virtual-content generator) indicative of a virtual object with which the hand is virtually interacting or initiating a virtual interaction. The systems and techniques may generate for display, and/or display, a virtual hand interacting with the virtual object. The virtual hand may exhibit a position and a gesture. One or both of the position of the virtual hand or the gesture of the virtual hand may be based on the virtual-object data. In some cases, one or both of the position of the virtual hand and/or the gesture of the virtual hand may not correspond to the position of the hand or the gesture of the hand respectively.

As a first example, the gesture of the virtual hands may be based on the virtual-object data. For example, if a user reaches a hand to pinch a virtual steering wheel, a virtual hand may be displayed grasping the steering wheel based on an interaction pose of the steering wheel. In the present disclosure, the term "interaction pose" may refer to a virtual interaction that matches the virtual object. For example, the interaction pose of a virtual steering wheel may indicate that the virtual steering wheel is to be grasped by one or two virtual hands, with virtual palms facing away from the user. The position of the virtual hands may be based on the position of the hands of the user (e.g., such that as the user moves their hands, the virtual hands move to match the position of the user's hands).

As a second example, the position of the virtual hands may be based on the virtual-object data. For example, if a user reaches to grab a virtual bowling ball, then quickly moves their hand upward, a virtual hand may be displayed grabbing the virtual bowling ball. The virtual hand and the virtual bowling ball may then move more slowly than the real hand to move upward (e.g., simulating inertia and/or gravity based on a simulated weight of the virtual bowling ball).

By displaying virtual interactions based on characteristics of virtual objects, systems and techniques may improve users' virtual experiences. For example, by displaying a virtual hand that virtually interacts with a virtual object in a way that matches the virtual object, the virtual interaction with the virtual object may appear to be more real to a user than if the virtual hand were displayed exhibiting a gesture that does not match the virtual object. As another example, by displaying the movement of a virtual hand and virtual object in a way that simulates weight of the virtual object, the virtual object appear to be more real to the user than if the virtual object were to move around without any simulated weight.

Various aspects of the application will be described with respect to the figures below.

FIG. 1 is a diagram illustrating an example of an extended reality (XR) system 100, according to aspects of the disclosure. As shown, XR system 100 includes an XR device 102, a companion device 104, and a communication link 106 between XR device 102 and companion device 104. In some cases, XR device 102 may generally implement display, image-capture, and/or view-tracking aspects of extended reality, including virtual reality (VR), augmented reality (AR), mixed reality (MR), etc. In some cases, companion device 104 may generally implement computing aspects of extended reality. For example, XR device 102 may capture images of an environment of a user 108 and provide the images to companion device 104 (e.g., via communication link 106). Companion device 104 may render virtual content (e.g., related to the captured images of the environment) and provide the virtual content to XR device 102 (e.g., via communication link 106). XR device 102 may display the virtual content to a user 108 (e.g., within a field of view 110 of user 108). In other cases, XR device 102 and companion device 104 may be included in the same device, or XR device 102 and companion device 104 may be directly connected.

Generally, XR device 102 may display virtual content to be viewed by a user 108 in field of view 110. In some examples, XR device 102 may include a transparent surface (e.g., optical glass) such that virtual objects may be displayed on (e.g., by being projected onto) the transparent surface to overlay virtual content on real-word objects viewed through the transparent surface (e.g., in a see-through configuration). In some cases, XR device 102 may include a camera and may display both real-world objects (e.g., as frames or images captured by the camera) and virtual objects overlaid on the displayed real-world objects (e.g., in a pass-through configuration). In various examples, XR device 102 may include aspects of a virtual reality headset, smart glasses, a live feed video camera, a GPU, one or more sensors (e.g., such as one or more inertial measurement units (IMUs), image sensors, microphones, etc.), one or more output devices (e.g., such as speakers, display, smart glass, etc.), etc.

Companion device 104 may render the virtual content to be displayed by XR device 102. In some examples, companion device 104 may be, or may include, a smartphone, laptop, tablet computer, personal computer, gaming system, a server computer or server device (e.g., an edge or cloud-based server, a personal computer acting as a server device, or a mobile device acting as a server device), any other computing device and/or a combination thereof.

In some cases, communication link 106 may be a wireless connection according to any suitable wireless protocol, such as, for example, Institute of Electrical and Electronics Engineers (IEEE) 802.11 (Wi-Fi), IEEE 802.15, or Bluetooth®. In some cases, communication link 106 may be a direct wireless connection between XR device 102 and companion device 104. In other cases, communication link 106 may be through one or more intermediary devices, such as, for example, routers or switches and/or across a network. In other cases (e.g., cases in which XR device 102 and companion device 104 are included in the same device, or XR device 102 and companion device 104 are directly connected) communication link 106 may be a wired connection (e.g., through a bus or printed circuit board).

Figure 2:
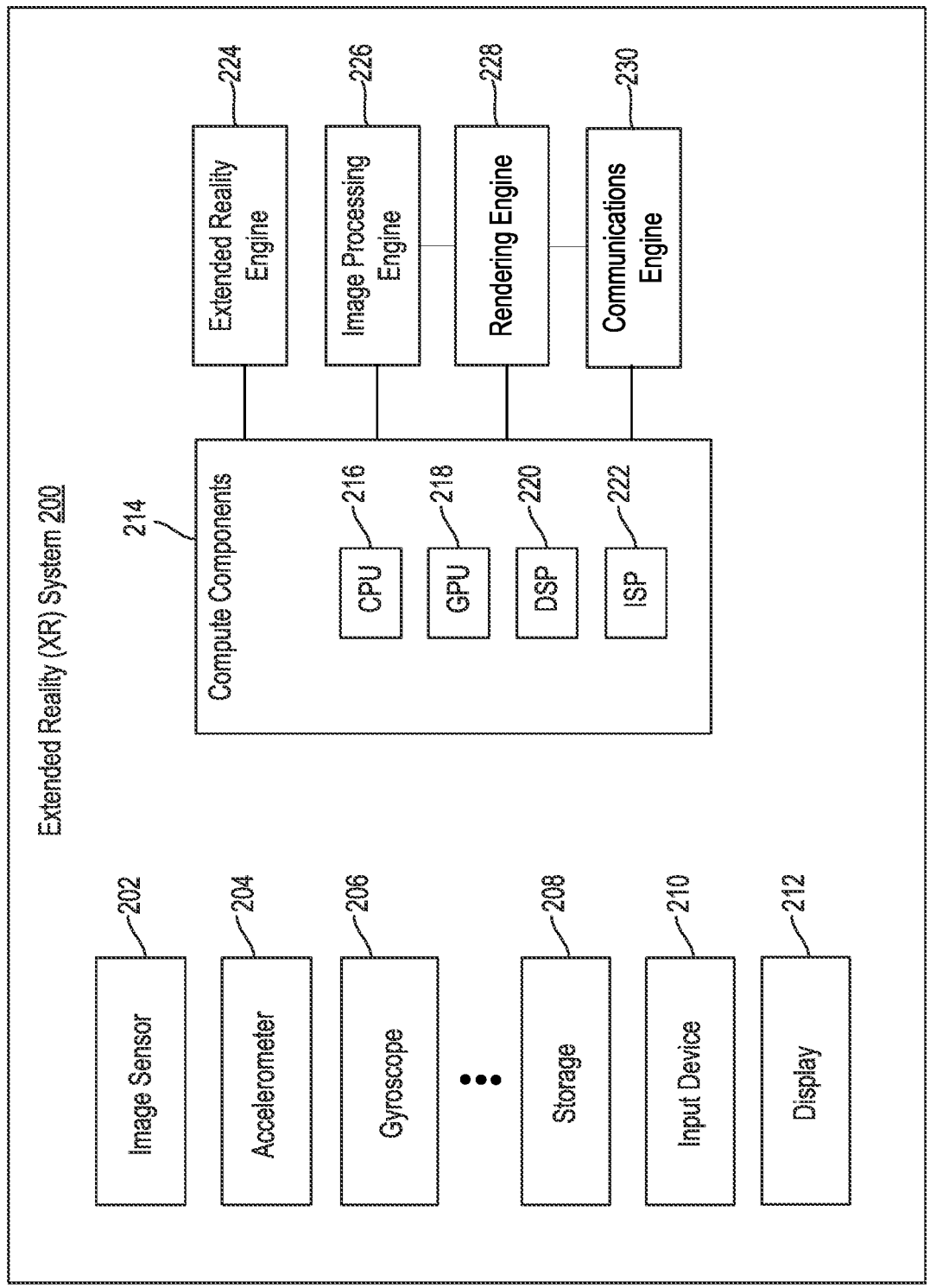
FIG. 2 is a diagram illustrating an architecture of an example extended reality (XR) system, in accordance with some aspects of the disclosure.

FIG. 2 is a diagram illustrating an architecture of an example extended reality (XR) system 200, in accordance with some aspects of the disclosure. XR system 200 may execute XR applications and implement XR operations.

In this illustrative example, XR system 200 includes one or more image sensors 202, an accelerometer 204, a gyroscope 206, storage 208, an input device 210, a display 212, Compute components 214, an XR engine 224, an image processing engine 226, a rendering engine 228, and a communications engine 230. It should be noted that the components 202-230 shown in FIG. 2 are non-limiting examples provided for illustrative and explanation purposes, and other examples may include more, fewer, or different components than those shown in FIG. 2. For example, in some cases, XR system 200 may include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors. audio sensors, etc.), one or more display devices, one more other processing engines, one or more other hardware components, and/or one or more other software and/or hardware components that are not shown in FIG. 2. While various components of XR system 200, such as image sensor 202, may be referenced in the singular form herein, it should be understood that XR system 200 may include multiple of any component discussed herein (e.g., multiple image sensors 202).

Display 212 may be, or may include, a glass, a screen, a lens, a projector, and/or other display mechanism that, in some cases, allows a user to see the real-world environment and also allows XR content to be overlaid, overlapped, blended with, or otherwise displayed thereon. In other cases, display 212 may be a display that doesn't allow the user to see the real-world environment (e.g., a display filling most, or all, of a field of view of the user). Display 212 may include separate portions (e.g., one for each eye) for stereoscopic viewing.

XR system 200 may include, or may be in communication with, (wired or wirelessly) an input device 210. Input device 210 may include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device discussed herein, or any combination thereof. In some cases, image sensor 202 may capture images (e.g., images of hands of a user) that may be processed for interpreting gesture commands.

XR system 200 may also communicate with one or more other electronic devices (wired or wirelessly). For example, communications engine 230 may be configured to manage connections and communicate with one or more electronic devices. In some cases, communications engine 230 may correspond to communication interface 1326 of FIG. 13.

In some implementations, image sensors 202, accelerometer 204, gyroscope 206, storage 208, display 212, compute components 214, XR engine 224, image processing engine 226, and rendering engine 228 may be part of the same computing device. For example, in some cases, image sensors 202, accelerometer 204, gyroscope 206, storage 208, display 212, compute components 214, XR engine 224, image processing engine 226, and rendering engine 228 may be integrated into an HMD, extended reality glasses, smartphone, laptop, tablet computer, gaming system, and/or any other computing device. However, in some implementations, image sensors 202, accelerometer 204, gyroscope 206, storage 208, display 212, compute components 214, XR engine 224, image processing engine 226, and rendering engine 228 may be part of two or more separate computing devices. For instance, in some cases, some of the components 202-230 may be part of, or implemented by, one computing device and the remaining components may be part of, or implemented by, one or more other computing devices. For example, such as in a split perception XR system, XR system 200 may include a first device (e.g., an HMD), including display 212, image sensor 202, accelerometer 204, gyroscope 206, and/or one or more compute components 214. XR system 200 may also include a second device including additional compute components 214 (e.g., implementing XR engine 224, image processing engine 226, rendering engine 228, and/or communications engine 230). In such an example, the second device may generate virtual content based on information or data (e.g., images, sensor data such as measurements from accelerometer 204 and gyroscope 206) and may provide the virtual content to the first device for display at the first device. The second device may be, or may include, a smartphone, laptop, tablet computer, personal computer, gaming system, a server computer or server device (e.g., an edge or cloud-based server, a personal computer acting as a server device, or a mobile device acting as a server device), any other computing device and/or a combination thereof.

Storage 208 may be any storage device(s) for storing data. Moreover, storage 208 may store data from any of the components of XR system 200. For example, storage 208 may store data from image sensor 202 (e.g., image or video data), data from accelerometer 204 (e.g., measurements), data from gyroscope 206 (e.g., measurements), data from compute components 214 (e.g., processing parameters, preferences, virtual content, rendering content, scene maps, tracking and localization data, object detection data, privacy data, XR application data, face recognition data, occlusion data, etc.), data from XR engine 224, data from image processing engine 226, and/or data from rendering engine 228 (e.g., output frames). In some examples, storage 208 may include a buffer for storing frames for processing by compute components 214.

Compute components 214 may be, or may include, a central processing unit (CPU) 216, a graphics processing unit (GPU) 218, a digital signal processor (DSP) 220, an image signal processor (ISP) 222, and/or other processor (e.g., a neural processing unit (NPU) implementing one or more trained neural networks). Compute components 214 may perform various operations such as image enhancement, computer vision, graphics rendering, extended reality operations (e.g., tracking, localization, pose estimation, mapping, content anchoring, content rendering, predicting, etc.), image and/or video processing, sensor processing, recognition (e.g., text recognition, facial recognition, object recognition, feature recognition, tracking or pattern recognition, scene recognition, occlusion detection, etc.), trained machine-learning operations, filtering, and/or any of the various operations described herein. In some examples, compute components 214 may implement (e.g., control, operate, etc.) XR engine 224, image processing engine 226, and rendering engine 228. In other examples, compute components 214 may also implement one or more other processing engines.

Image sensor 202 may include any image and/or video sensors or capturing devices. In some examples, image sensor 202 may be part of a multiple-camera assembly, such as a dual-camera assembly. Image sensor 202 may capture image and/or video content (e.g., raw image and/or video data), which may then be processed by compute components 214, XR engine 224, image processing engine 226, and/or rendering engine 228 as described herein.

In some examples, image sensor 202 may capture image data and may generate images (also referred to as frames) based on the image data and/or may provide the image data or frames to XR engine 224, image processing engine 226, and/or rendering engine 228 for processing. An image or frame may include a video frame of a video sequence or a still image. An image or frame may include a pixel array representing a scene. For example, an image may be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, image sensor 202 (and/or other camera of XR system 200) may be configured to also capture depth information. For example, in some implementations, image sensor 202 (and/or other camera) may include an RGB-depth (RGB-D) camera. In some cases, XR system 200 may include one or more depth sensors (not shown) that are separate from image sensor 202 (and/or other camera) and that may capture depth information. For instance, such a depth sensor may obtain depth information independently from image sensor 202. In some examples, a depth sensor may be physically installed in the same general location or position as image sensor 202, but may operate at a different frequency or frame rate from image sensor 202. In some examples, a depth sensor may take the form of a light source that may project a structured or textured light pattern, which may include one or more narrow bands of light, onto one or more objects in a scene. Depth information may then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

XR system 200 may also include other sensors in its one or more sensors. The one or more sensors may include one or more accelerometers (e.g., accelerometer 204), one or more gyroscopes (e.g., gyroscope 206), and/or other sensors. The one or more sensors may provide velocity, orientation, and/or other position-related information to compute components 214. For example, accelerometer 204 may detect acceleration by XR system 200 and may generate acceleration measurements based on the detected acceleration. In some cases, accelerometer 204 may provide one or more translational vectors (e.g., up/down, left/right, forward/back) that may be used for determining a position or pose of XR system 200. Gyroscope 206 may detect and measure the orientation and angular velocity of XR system 200. For example, gyroscope 206 may be used to measure the pitch, roll, and yaw of XR system 200. In some cases, gyroscope 206 may provide one or more rotational vectors (e.g., pitch, yaw, roll). In some examples, image sensor 202 and/or XR engine 224 may use measurements obtained by accelerometer 204 (e.g., one or more translational vectors) and/or gyroscope 206 (e.g., one or more rotational vectors) to calculate the pose of XR system 200. As previously noted, in other examples, XR system 200 may also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors may include at least one IMU. An IMU is an electronic device that measures the specific force, angular rate, and/or the orientation of XR system 200, using a combination of one or more accelerometers, one or more gyroscopes, and/or one or more magnetometers. In some examples, the one or more sensors may output measured information associated with the capture of an image captured by image sensor 202 (and/or other camera of XR system 200) and/or depth information obtained using one or more depth sensors of XR system 200.

The output of one or more sensors (e.g., accelerometer 204, gyroscope 206, one or more IMUs, and/or other sensors) can be used by XR engine 224 to determine a pose of XR system 200 (also referred to as the head pose) and/or the pose of image sensor 202 (or other camera of XR system 200). In some cases, the pose of XR system 200 and the pose of image sensor 202 (or other camera) can be the same. The pose of image sensor 202 refers to the position and orientation of image sensor 202 relative to a frame of reference (e.g., with respect to a field of view 110 of FIG. 1). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees Of Freedom (3DoF), which refers to the three angular components (e.g. roll, pitch, and yaw).

In some cases, a device tracker (not shown) can use the measurements from the one or more sensors and image data from image sensor 202 to track a pose (e.g., a 6DoF pose) of XR system 200. For example, the device tracker can fuse visual data (e.g., using a visual tracking solution) from the image data with inertial data from the measurements to determine a position and motion of XR system 200 relative to the physical world (e.g., the scene) and a map of the physical world. As described below, in some examples, when tracking the pose of XR system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of XR system 200 within the scene and the 3D map of the scene, etc. The 3D map can provide a digital representation of a scene in the real/physical world. In some examples, the 3D map can anchor position-based objects and/or content to real-world coordinates and/or objects. XR system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 202 and/or XR system 200 as a whole can be determined and/or tracked by compute components 214 using a visual tracking solution based on images captured by image sensor 202 (and/or other camera of XR system 200). For instance, in some examples, compute components 214 can perform tracking using computer vision-based tracking, model-based tracking, and/or simultaneous localization and mapping (SLAM) techniques. For instance, compute components 214 can perform SLAM or can be in communication (wired or wireless) with a SLAM system (not shown). SLAM refers to a class of techniques where a map of an environment (e.g., a map of an environment being modeled by XR system 200) is created while simultaneously tracking the pose of a camera (e.g., image sensor 202) and/or XR system 200 relative to that map. The map can be referred to as a SLAM map, and can be three-dimensional (3D). The SLAM techniques can be performed using color or grayscale image data captured by image sensor 202 (and/or other camera of XR system 200), and can be used to generate estimates of 6DoF pose measurements of image sensor 202 and/or XR system 200. Such a SLAM technique configured to perform 6DoF tracking can be referred to as 6DoF SLAM. In some cases, the output of the one or more sensors (e.g., accelerometer 204, gyroscope 206, one or more IMUs, and/or other sensors) can be used to estimate, correct, and/or otherwise adjust the estimated pose.

Figure 3:
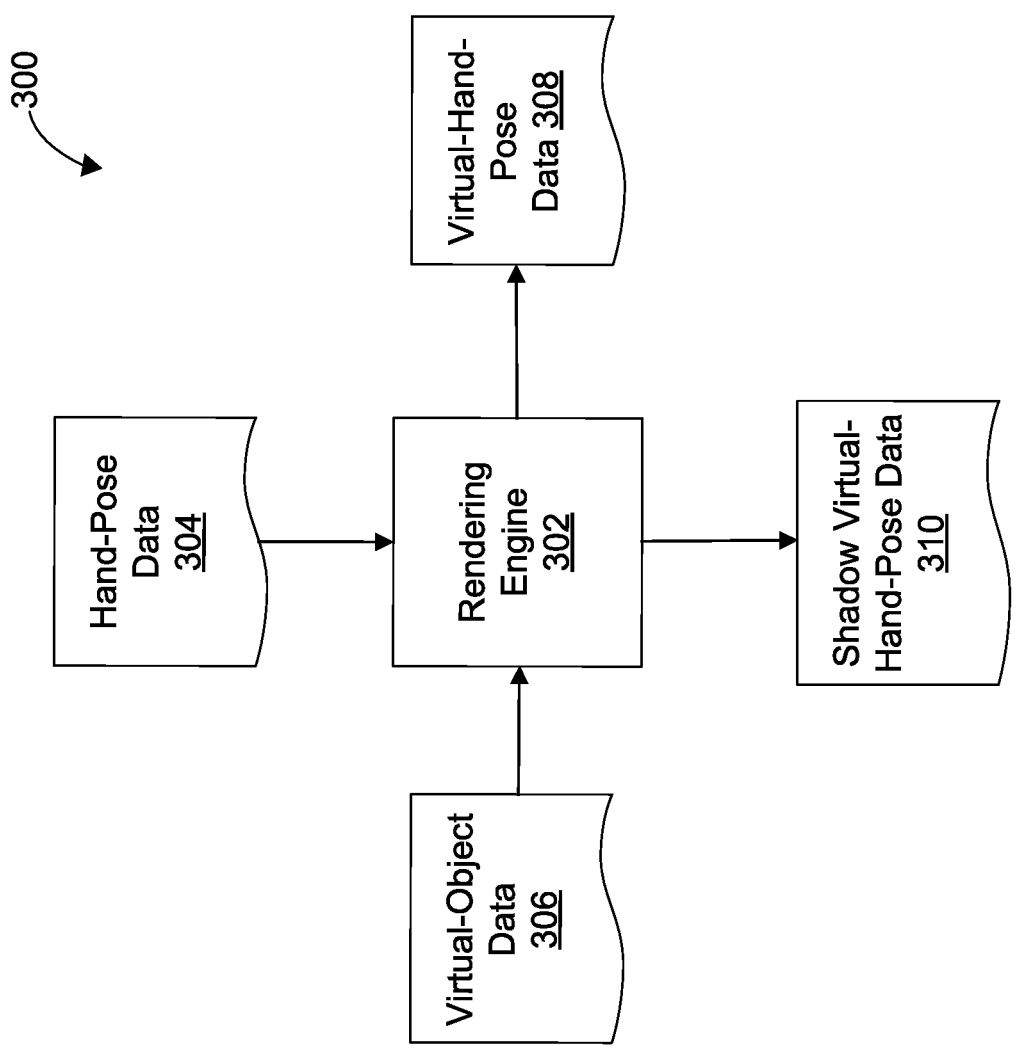
FIG. 3 is a block diagram illustrating an example system for generating and/or displaying virtual interactions, according to various aspects of the present disclosure.

FIG. 3 is a block diagram illustrating an example system 300 for generating and/or displaying virtual interactions, according to various aspects of the present disclosure. System 300 includes a rendering engine 302, which may, in general, obtain hand-pose data 304 and virtual-object data 306 and generate virtual-hand-pose data 308 based on hand-pose data 304 and/or virtual-object data 306. System 300 (and more specifically rendering engine 302) may be implemented in XR system 100 of FIG. 1 (e.g., at companion device 104) and/or in XR system 200 of FIG. 2 (e.g., at or any or all of compute components 214, XR engine 224, image processing engine 226, and/or rendering engine 228).

Hand-pose data 304 may be, or may include, information regarding one or more hands of one or more users. Hand-pose data 304 may include position information indicative of a position of the one or more hands. The position information may be relative to an XR system including rendering engine 302 or relative to a 3D map of the real world. The position information may include position information for one or more points of the one or more hands. For example, the position information may include a position of each of five respective fingertips of a hand, a position for each of five respective knuckles of the hand, a position of one or more points of a palm of hand, etc.

Additionally, hand-pose data 304 may include gesture information. The gesture information may include an interpretation of the position information. For example, a gesture of a hand based on the positions of one or more points of the hand. Examples of gestures include pinching, grabbing with a palm away from the user, grabbing with a palm toward the user, pointing, releasing a grasp, etc. Rendering engine 302, or other elements of system 300, may take gestures as input (e.g., as an instruction or intention of a user). For example, system 300 may take a pinch, or a grab, as an indication that the user wishes to interact with a virtual object.

Hand-pose data 304 may be obtained by a hand tracker. For example, system 300 may include a hand tracker. Alternatively, system 300 may receive hand-pose data 304 from a hand tracker. The hand tracker may be a machine-learning model trained to infer gestures based on images of hands. The hand tracker may obtain one or more images of the hand and determine, based on the one or more images of the hand, the hand-pose data.

Virtual-object data 306 may be, or may include, data regarding a virtual object. Virtual-object data 306 may include a position of the virtual object. The position of the virtual object may be relative to the XR system including rendering engine 302 or relative to a 3D map of the real world. Additionally, virtual-object data 306 may include data indicative of characteristics of the virtual object, the characteristics including: a size of the virtual object, a shape of the virtual object, a weight of the virtual object, a distance between the hand and the virtual object, an interaction pose of the virtual object, any combination thereof, and/or other property of the virtual object.

Virtual-object data 306 may be received by rendering engine 302 from another element of system 300 (e.g., XR engine 224 of FIG. 2) as illustrated in system 300. Alternatively, virtual-object data 306 may be generated by rendering engine 302.

Rendering engine 302 may generate virtual-hand-pose data 308 based on hand-pose data 304 and/or virtual-object data 306. For example, rendering engine 302 may determine that the hand of hand-pose data 304 is virtually interacting with (or initiating a virtual interaction with) the virtual object of virtual-object data 306 (e.g., based on a relationship between the position of the hand and the position of the virtual object and the gesture of the hand). For instance, rendering engine 302 may determine that a user is initiating a virtual interaction with a virtual object based on the user reaching a hand toward the position of the virtual object, and initiating a pinch or grab gesture.

After determining a virtual interaction between the hand and the virtual object, rendering engine 302 may generate virtual-hand-pose data 308. Virtual-hand-pose data 308 may be data for displaying a virtual hand interacting with the virtual object. Virtual-hand-pose data 308 may include a position of the virtual hand and a gesture of the virtual hand. The position of the virtual hand may be relative to the XR system including rendering engine 302 or relative to a 3D map of the real world. Virtual-hand-pose data 308 may be provided to a display (e.g., of XR device 102 of FIG. 1 or display 212 of FIG. 2). The display may display the virtual hand interacting with the virtual object.

The position and/or gesture of the virtual hand may, or may not, correspond to the position and/or gesture of the hand of hand-pose data 304. For example, the position and/or gesture of the virtual hand may be based on virtual-object data 306 and hand-pose data 304 and may, or may not, correspond the position and/or gesture of the hand of hand-pose data 304. FIG. 4 through FIG. 10 include displayed virtual hands, displayed virtual objects, and real-world hands illustrating examples of virtual hands being displayed based on virtual-object data 306 and hand-pose data 304.

By displaying a virtual hand (of virtual-hand-pose data 308), system 300 may display a virtual interaction with a virtual object that matches the virtual object, without the virtual hand corresponding to the position and/or gesture of the hand of the user. For example, system 300 may display a virtual hand grabbing a virtual steering wheel even though the hand of the user is pinching. As another example, system 300 may display virtual hands that are slow to lift a virtual object that has a weight associated with it even though the hand of the user moves freely and quickly (e.g., the virtual hands and virtual object may simulate inertia of the virtual object). The match between the virtual hand gesture and the virtual object may make the virtual object to appear to be more real to the user.

Additionally, according to some aspects, rendering engine 302 may generate shadow virtual-hand-pose data 310 for display. Shadow virtual-hand-pose data 310 may be data for displaying a shadow virtual hand. Shadow virtual-hand-pose data 310 may include position information of a shadow virtual hand and gesture information of a shadow virtual hand. The position of the shadow virtual hand may be relative to the XR system including rendering engine 302 or relative to a 3D map of the real world. Shadow virtual-hand-pose data 310 may be provided to a display (e.g., of XR device 102 of FIG. 1 or display 212 of FIG. 2). The shadow virtual hand may be displayed as translucent (e.g., shadow virtual-hand-pose data 310 may indicate that shadow virtual-hand-pose data 310 is translucent).

Figure 9:
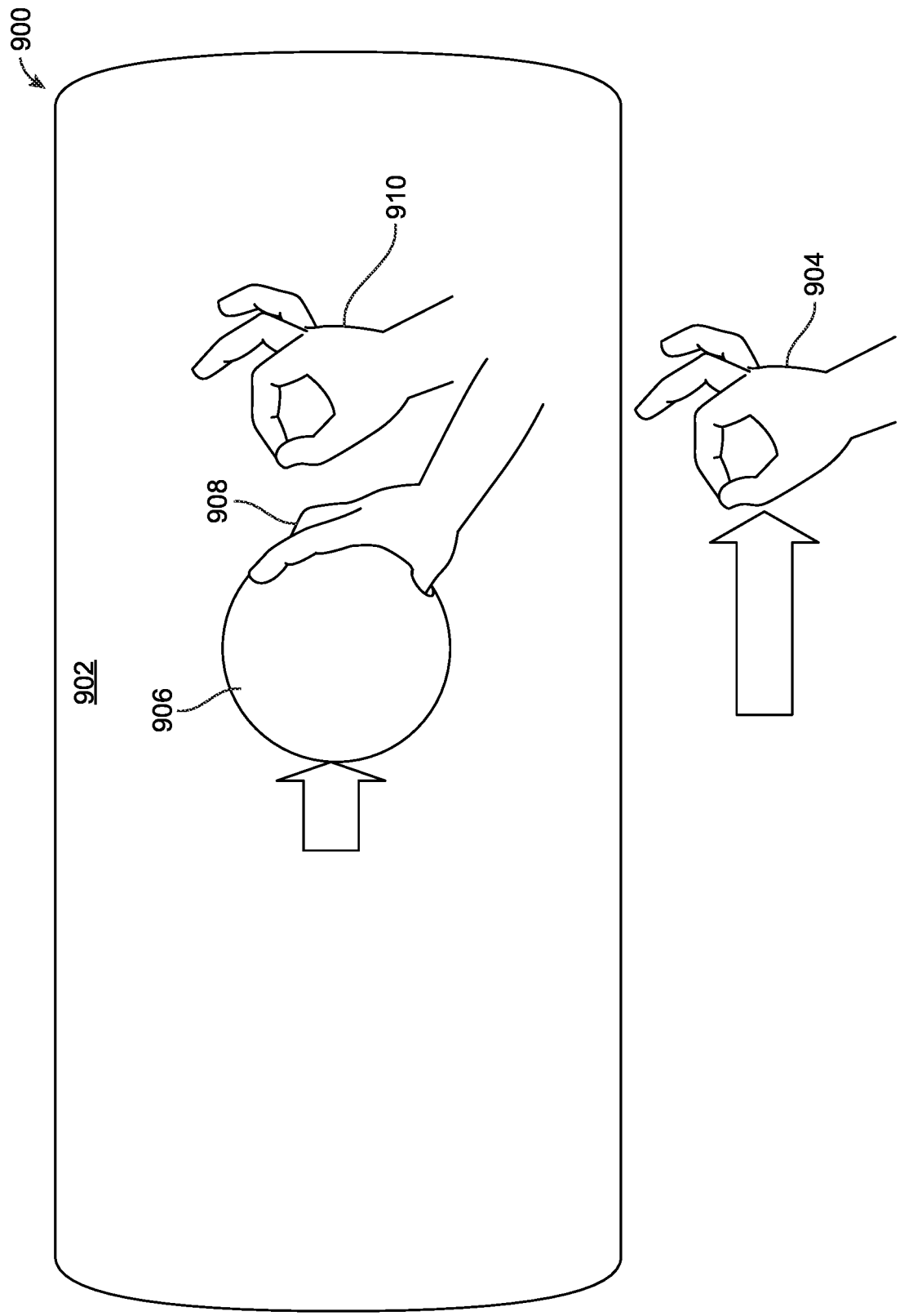
FIG. 9 is a diagram illustrating yet another example scenario including displaying virtual interactions, according to various aspects of the present disclosure.
Figure 10:
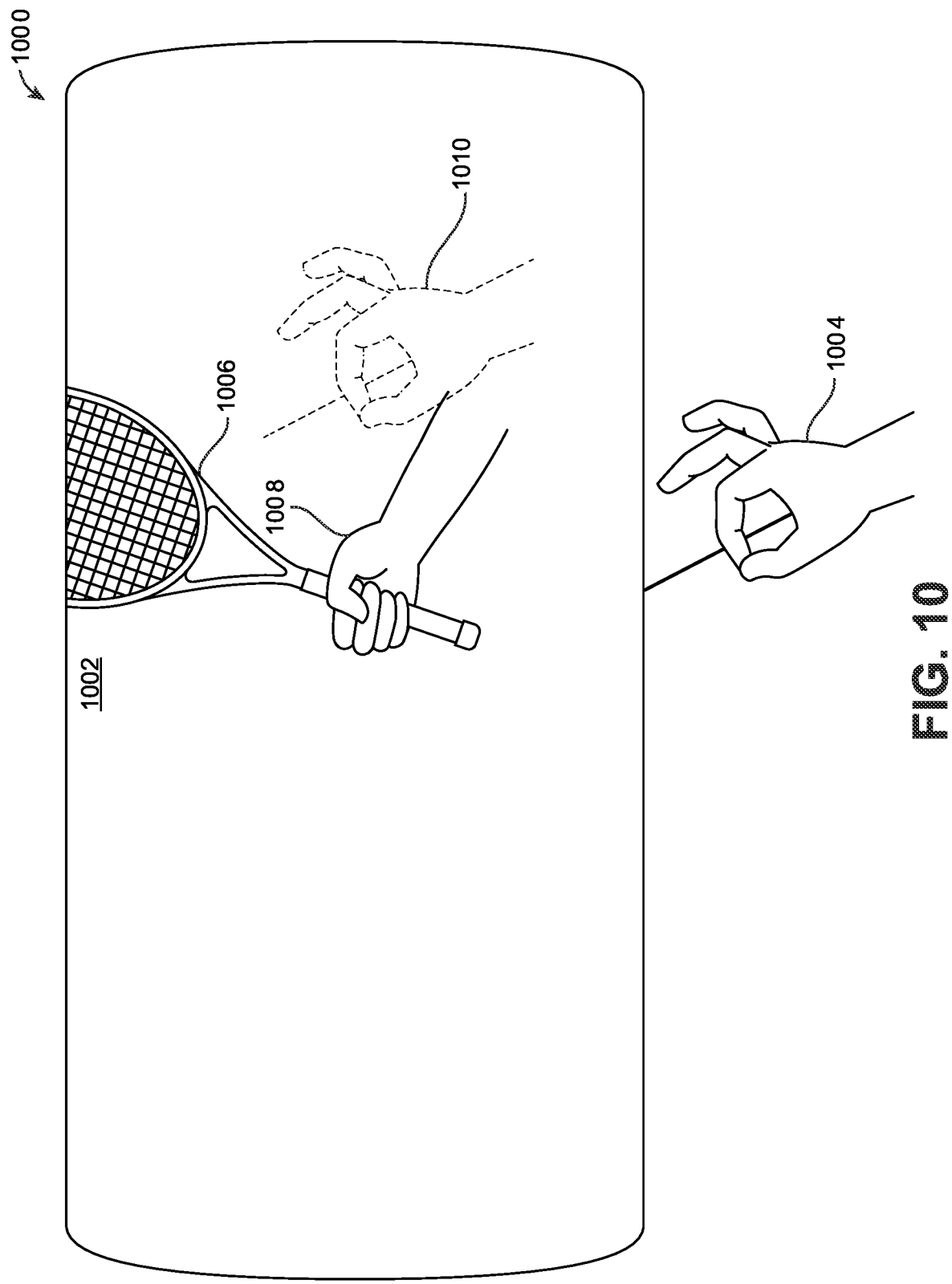
FIG. 10 is a diagram illustrating yet another example scenario including displaying virtual interactions, according to various aspects of the present disclosure.

The position and/or gesture of shadow virtual-hand-pose data 310 may correspond to the position and/or gesture of the hand of the user. For example, the user may reach out and perform a pinch indicating that the user intends to virtually pick up a virtual object. The virtual object may have an interaction pose and a weight associated with it. According to a virtual experience, virtual hands may be slow to lift the virtual object and the virtual hands may grasp the object according to the interaction pose rather than according to the pinch of the user's hand. The shadow virtual hands may correspond to the user's hands and may maintain the pinch and move without being affected by the weight associated with the virtual object. FIG. 9 and FIG. 10 include displayed virtual hands, displayed virtual objects, displayed shadow virtual hands, and real-world hands illustrating examples of virtual hands being displayed based on virtual-object data 306 and hand-pose data 304 and shadow virtual hands being displayed based on hand-pose data 304.

By displaying a shadow virtual hand (of shadow virtual-hand-pose data 310), the position and/or gesture of the shadow virtual hand corresponding to the position and/or gesture of the user's hand, system 300 may be displaying an indication of the position and/or gesture of the user's hand. The user's hand may not be visible to the user because the display may occlude the user's view of the user's hand.

By displaying a virtual hand and a shadow virtual hand, system 300 may be displaying differences between the user's hand and the virtual hand. Such displayed differences may be a part of a virtual experience. For example, the position of a shadow virtual hand being different from the position of a virtual hand may indicate to the user that the user's hand has passed through a virtual boundary (e.g., a virtual wall or a virtual object). As another example, a gesture of the shadow virtual hand being different than a gesture of the virtual hand may indicate that the user's hand gesture doesn't match the virtual object (e.g., based on an interaction pose of the virtual object). As another example, a position of the shadow virtual hand being different from a position of the virtual hand may indicate to the user that the virtual hand is encountering resistance (e.g., based on a virtual object).

Figure 4:
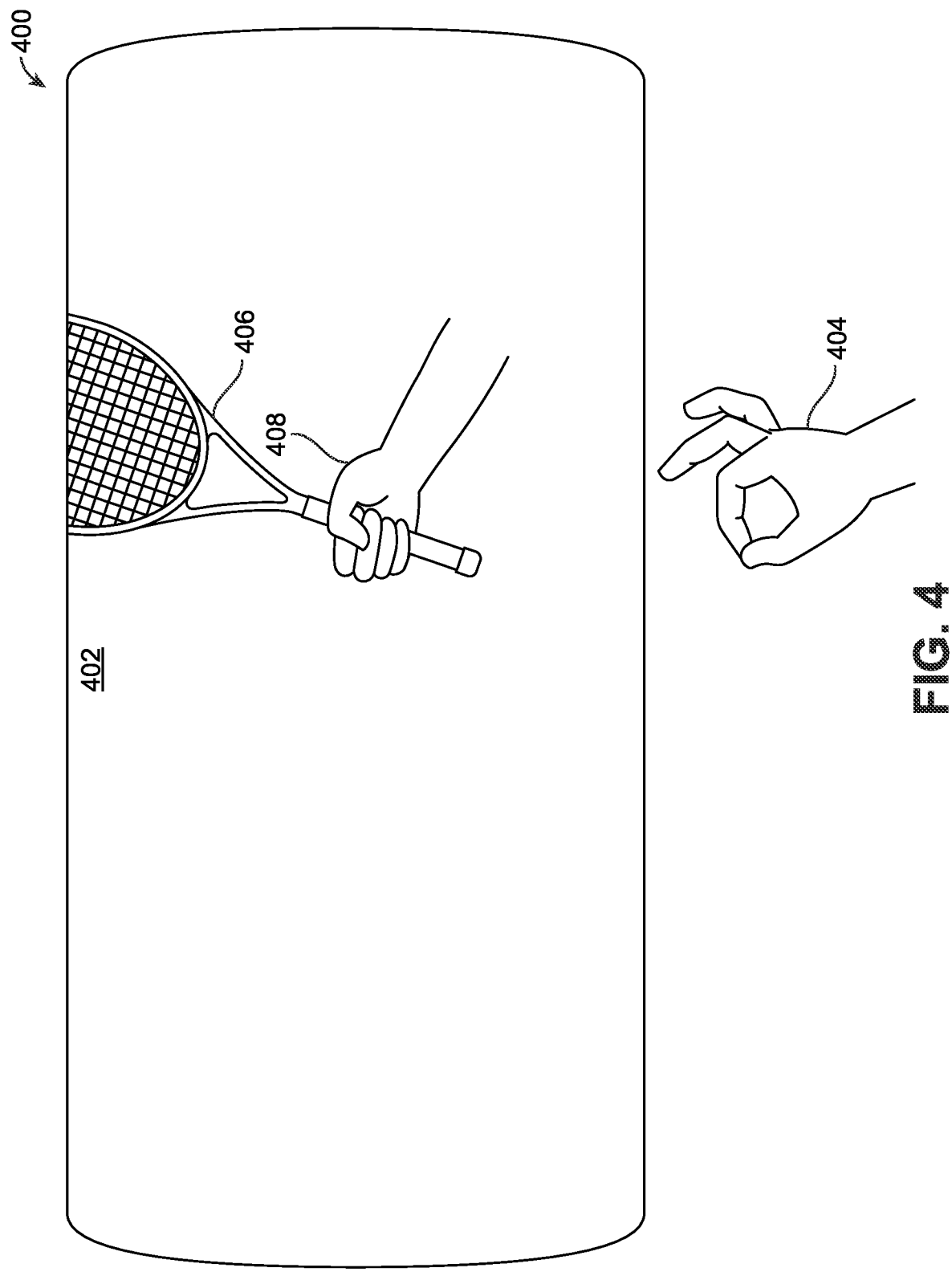
FIG. 4 is a diagram illustrating an example scenario including displaying virtual interactions, according to various aspects of the present disclosure.

FIG. 4 is a diagram illustrating an example scenario 400 including displaying virtual interactions, according to various aspects of the present disclosure. In scenario 400, a display 402 displays a virtual hand 408 interacting with a virtual object 406. The position and/or gesture of virtual hand 408 is based on characteristics of virtual object 406 and on a position and/or gesture of a hand 404. Display 402 may be part of an XR system (e.g., XR system 100 of FIG. 1 or XR system 200 of FIG. 2).

In scenario 400, the position of virtual hand 408 may correspond to the position of hand 404. For example, a hand tracker of the XR system may determine position data of hand 404. A rendering engine (e.g., rendering engine 302 of FIG. 3) of the XR system may render virtual hand 408 with a position that corresponds (e.g., within a field of view 110 of FIG. 1) with the position of hand 404. As hand 404 moves, the hand tracker may track hand 404 and update the position of hand 404. The rendering engine may update the position of virtual hand 408 to correspond with the updated position of hand 404.

Additionally, in scenario 400, the gesture of virtual hand 408 may be based on characteristics of virtual object 406 and may, or may not, correspond to the gesture of hand 404. According to the example of scenario 400, virtual object 406 have an interaction pose, for example, a grasp, with the palm facing toward the user. The XR system may interpret the pinch gesture of hand 404 as an intent to grab and/or hold virtual object 406. The XR system may initiate and maintain the grab and/or hold interaction allowing the user to virtually interact with virtual object 406. However, the rendering engine may display virtual hand 408 interacting with virtual object 406 according to the interaction pose of virtual object 406 and not according to the gesture of hand 404. Displaying virtual hand 408 interacting with virtual object 406 according to the interaction pose of virtual object 406 rather than the gesture of hand 404 may cause virtual object 406 and virtual hand 408 (and/or the interaction therebetween) to appear to be more real to the user.

Figure 5:
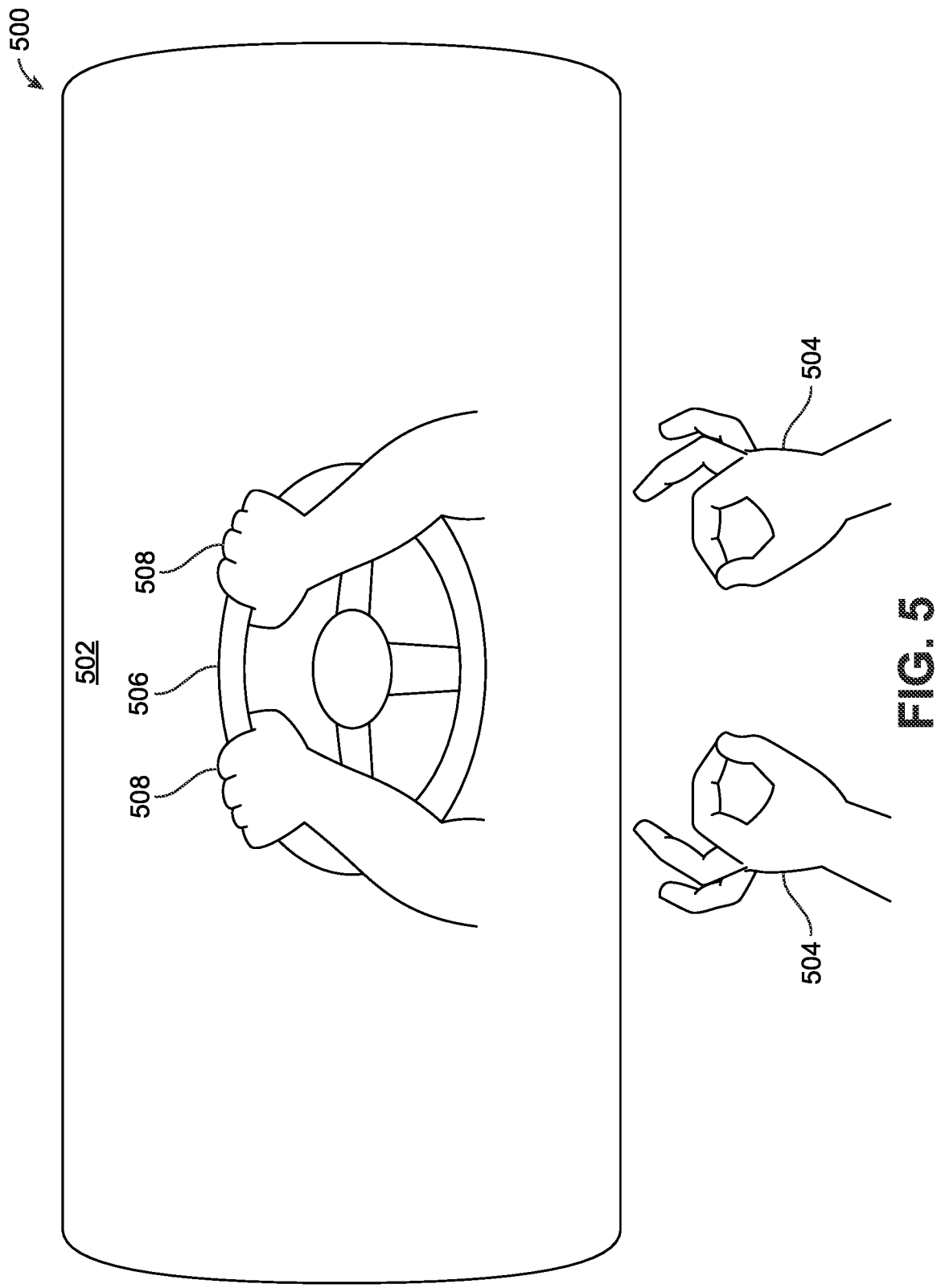
FIG. 5 is a diagram illustrating another example scenario including displaying virtual interactions, according to various aspects of the present disclosure.

FIG. 5 is a diagram illustrating an example scenario 500 including displaying virtual interactions, according to various aspects of the present disclosure. In scenario 500, a display 502 displays two virtual hands 508 interacting with a virtual object 506. The positions and/or gestures of virtual hands 508 are based on characteristics of virtual object 506 and on positions and/or gestures of hands 504. Display 502 may be part of an XR system (e.g., XR system 100 of FIG. 1 or XR system 200 of FIG. 2).

In scenario 500, the respective positions of virtual hands 508 may correspond to the respective positions of hands 504. For example, a hand tracker of the XR system may determine position data of hands 504. A rendering engine (e.g., rendering engine 302 of FIG. 3) of the XR system may render virtual hands 508 with respective positions that corresponds (e.g., within a field of view 110 of FIG. 1) with the respective positions of hands 504. As hands 504 move, the hand tracker may track hands 504 and update the respective positions of hands 504. The rendering engine may update the respective positions of virtual hands 508 to correspond with the updated respective positions of hands 504.

Additionally, in scenario 500, the respective gestures of virtual hands 508 may be based on characteristics of virtual object 506 and may, or may not, correspond to the respective gestures of hands 504. In the example of scenario 500, virtual object 506 have an interaction pose, for example, a grasp, with the palms facing away from the user. The XR system may interpret the pinch gestures of hands 504 as an intent to grab and/or hold virtual object 506. The XR system may initiate and maintain the grab and/or hold interaction allowing the user to virtually interact with virtual object 506. However, a rendering engine of the XR system may display virtual hands 508 interacting with virtual object 506 according to the interaction pose of virtual object 506 and not according to the gestures of hands 504. Displaying virtual hands 508 interacting with virtual object 506 according to the interaction pose of virtual object 506 rather than the gestures of hands 504 may cause virtual object 506 and virtual hands 508 (and/or the interaction therebetween) to appear to be more real to the user.

Figure 6:
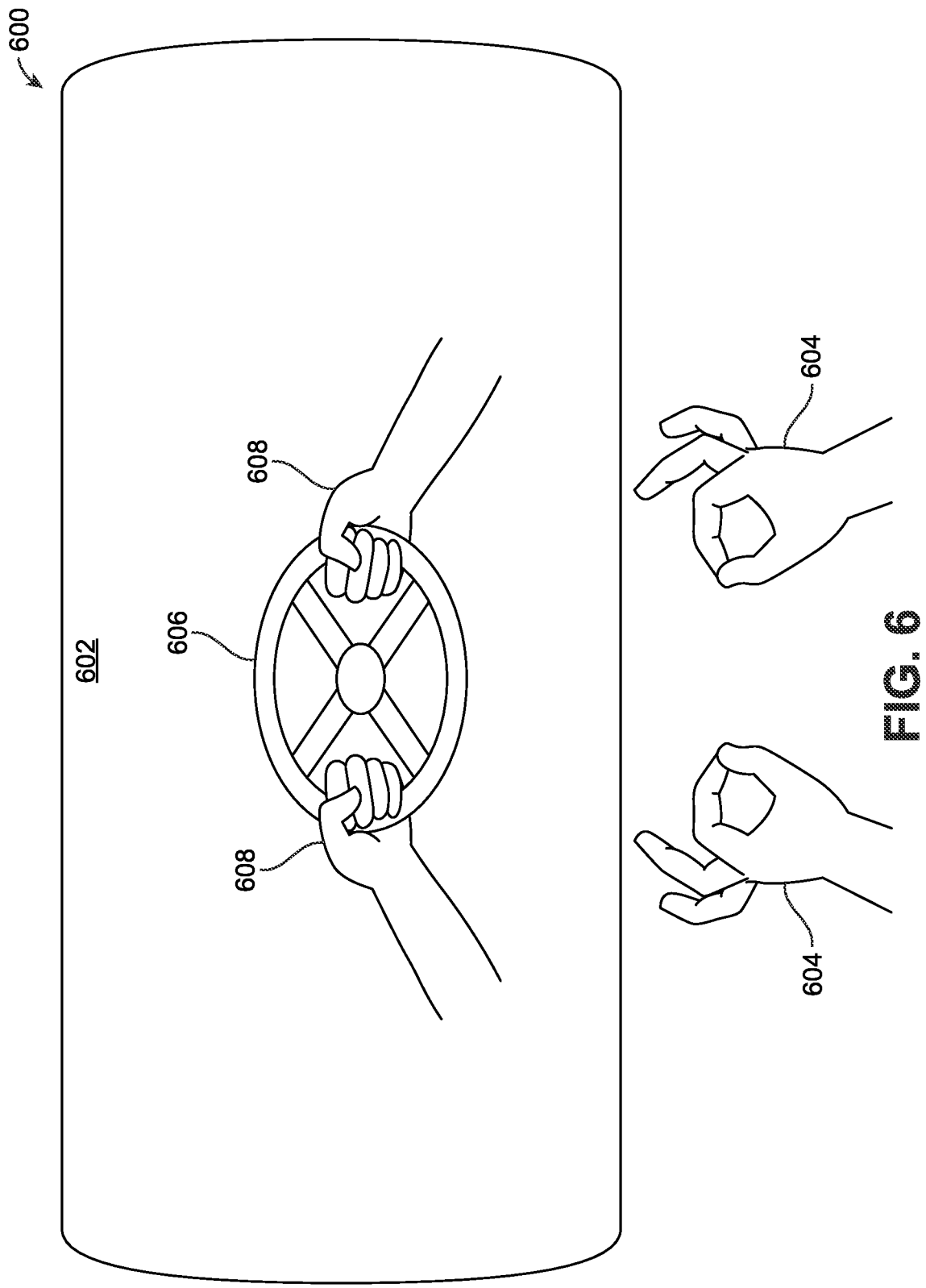
FIG. 6 is a diagram illustrating yet another example scenario including displaying virtual interactions, according to various aspects of the present disclosure.

FIG. 6 is a diagram illustrating an example scenario 600 including displaying virtual interactions, according to various aspects of the present disclosure. In scenario 600, a display 602 displays two virtual hands 608 interacting with a virtual object 606. The positions and/or gestures of virtual hands 608 are based on characteristics of virtual object 606 and on positions and/or gestures of hands 604. Display 602 may be part of an XR system (e.g., XR system 100 of FIG. 1 or XR system 200 of FIG. 2).

In scenario 600, the respective positions of virtual hands 608 may correspond to the respective positions of hands 604. For example, a hand tracker of the XR system may determine position data of hands 604. A rendering engine (e.g., rendering engine 302 of FIG. 3) of the XR system may render virtual hands 608 with respective positions that corresponds (e.g., within a field of view 110 of FIG. 1) with the respective positions of hands 604. As hands 604 move, the hand tracker may track hands 604 and update the respective positions of hands 604. The rendering engine may update the respective positions of virtual hands 608 to correspond with the updated respective positions of hands 604.

Additionally in scenario 600, the respective gestures of virtual hands 608 may be based on characteristics of virtual object 606 and may, or may not, correspond to the respective gestures of hands 604. According to the example of scenario 600, virtual object 606 have an interaction pose, for example, a grasp, with the palms facing toward the user. An XR system may interpret the pinch gestures of hands 604 as an intent to grab and/or hold virtual object 606. The XR system may initiate and maintain the grab and/or hold interaction allowing the user to virtually interact with virtual object 606. However, a rendering engine of the XR system may display virtual hands 608 interacting with virtual object 606 according to the interaction pose of virtual object 606 and not according to the gestures of hands 604. Displaying virtual hands 608 interacting with virtual object 606 according to the interaction pose of virtual object 606 rather than the gestures of hands 604 may cause virtual object 606 and virtual hands 608 (and/or the interaction therebetween) to appear to be more real to the user.

Notably, the respective gestures of hands 504 of FIG. 5 may be the same as the respective gestures of hands 604 of FIG. 6. Further, one or more characteristics of virtual object 506 of FIG. 5 and one or more characteristics of virtual object 606 of FIG. 6 may be the same. For example, virtual object 506 and virtual object 606 may have the same shape and/or size. However, an interaction pose of virtual object 506 may differ from an interaction pose of virtual object 606. Because the interaction pose of virtual object 506 differs from the interaction pose of virtual object 606, the gesture of virtual hands 508 differs from the gesture of virtual hands 608.

Figure 7:
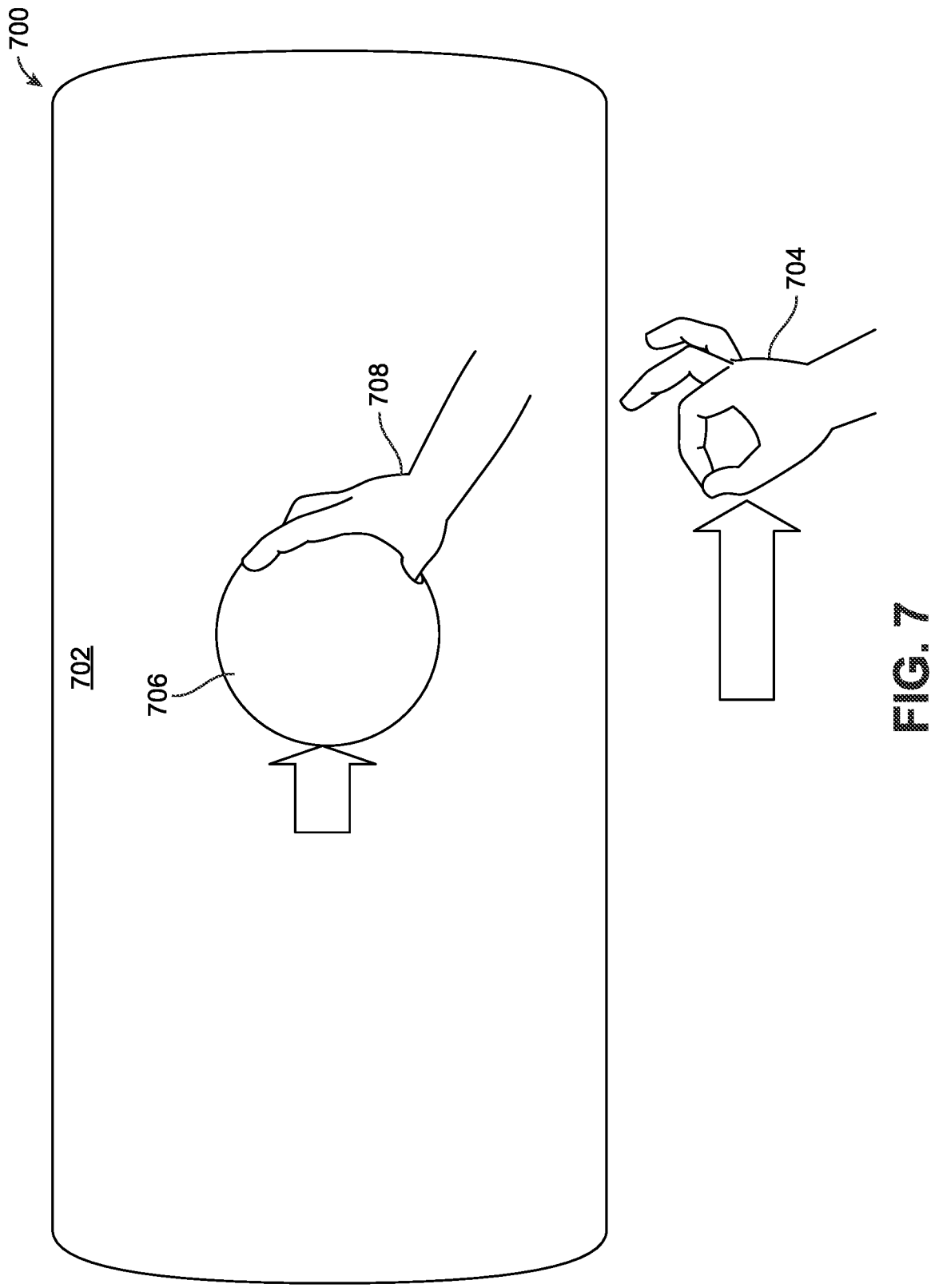
FIG. 7 is a diagram illustrating yet another example scenario including displaying virtual interactions, according to various aspects of the present disclosure.

FIG. 7 is a diagram illustrating an example scenario 700 including displaying virtual interactions, according to various aspects of the present disclosure. In scenario 700, a display 702 displays a virtual hand 708 interacting with a virtual object 706. The position and/or gesture of virtual hand 708 is based on characteristics of virtual object 706 and on a position and/or gesture of a hand 704. Display 702 may be part of an XR system (e.g., XR system 100 of FIG. 1 or XR system 200 of FIG. 2).

In scenario 700, the position of virtual hand 708 may be delayed relative to the position of hand 704 based on characteristics of virtual object 706. In the present disclosure, the term "delayed relative to," and like terms, may refer to a delayed correspondence between positions (e.g., the position of the virtual hand corresponding to a prior position of the hand). For example, a hand tracker of the XR system may determine position data of hand 704, including one or more positions of hand 704 at one or more corresponding times. A rendering engine (e.g., rendering engine 302 of FIG. 3) of the XR system may render virtual hand 708 with a position that corresponds (e.g., within a field of view 110 of FIG. 1) with a prior position of hand 704. For example, the hand tracker may determine that at a first time, hand 704 is at a first position, at a second time, hand 704 is at a second position, at a third time, hand 704 is at a third position, and at a fourth time, hand 704 is at a fourth position, etc. At the third time, display 702 may display virtual hand 708 at a position of display 702 that corresponds to the first position. At the fourth time, display 702 may display virtual hand 708 at a position of display 702 that corresponds to the second position. At a fifth time, display 702 may display virtual hand 708 at a position of display 702 that corresponds to the third position, etc.

The fact that virtual hand 708 is displayed is delayed relative to hand 704, and an amount of the delay (e.g, a duration of time between when hand 704 is at a location and when virtual hand 708 is displayed at the corresponding location of display 702), may be based on characteristics of virtual object 706. For example, the amount of delay may be based on a resistance of virtual object 706 to acceleration or to movement. For example, virtual object 706 may be associated with a weight and gravity and/or inertia may be simulated in when displaying movements of virtual object 706. For example, hand 704 may move quickly to one side. Virtual hand 708, interacting with virtual object 706 which has a weight associated with it, may move initially more slowly to the side. Additionally, in some cases, if hand 704 suddenly stops, virtual hand 708, carried by simulated inertia, may continue to move to the side before stopping. Additionally, or alternatively, upward movements of virtual object 706 may be more affected by delay than lateral or downward movements of virtual object 706 (e.g., based on simulated effects gravity on virtual object 706). Displaying virtual hand 708 interacting with virtual object 706 according to the characteristics of virtual object 706 rather than corresponding in time to the movements of hand 704 may cause virtual object 706 and virtual hand 708 (and/or the interaction therebetween) to appear to be more real to the user.

The gesture of virtual hand 708 may, or may not, be based on characteristics of virtual object 706. In some cases, virtual object 706 have an interaction pose, for example, a two-finger-plus-thumb grip of a bowling ball. The XR system may interpret the pinch gesture of hand 704 as an intent to grab and/or hold virtual object 706. The XR system may initiate and maintain the grab and/or hold interaction allowing the user to virtually interact with virtual object 706. However, the rendering engine may display virtual hand 708 interacting with virtual object 706 according to the interaction pose of virtual object 706 and not according to the gesture of hand 704. Displaying virtual hand 708 interacting with virtual object 706 according to the interaction pose of virtual object 706 rather than the gesture of hand 704 may cause virtual object 706 and virtual hand 708 (and/or the interaction therebetween) to appear to be more real to the user.

Figure 8:
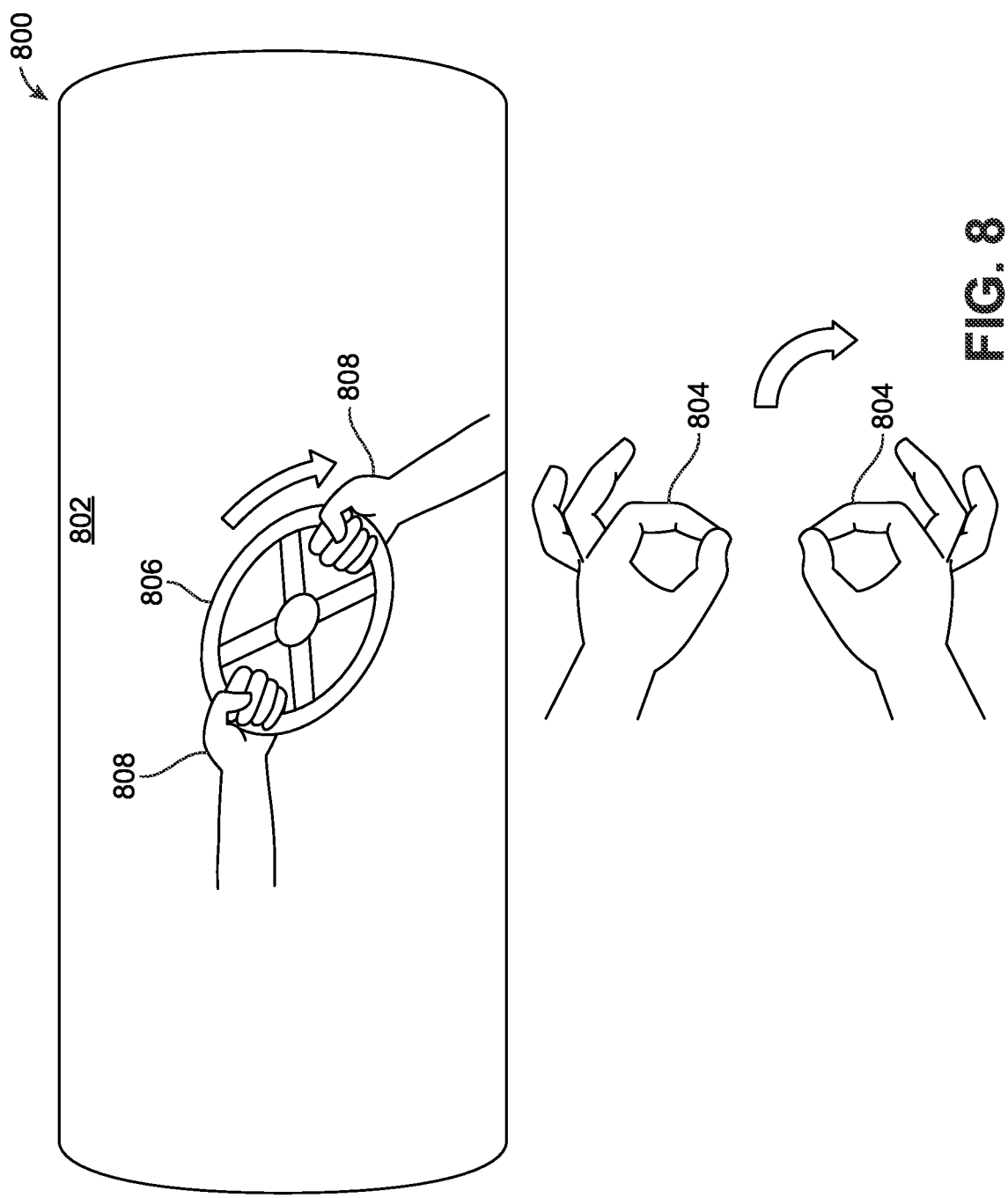
FIG. 8 is a diagram illustrating yet another example scenario including displaying virtual interactions, according to various aspects of the present disclosure.

FIG. 8 is a diagram illustrating an example scenario 800 including displaying virtual interactions, according to various aspects of the present disclosure. In scenario 800, a display 802 displays two virtual hands 808 interacting with a virtual object 806. The positions and/or gestures of virtual hands 808 are based on characteristics of virtual object 806 and on positions and/or gestures of hands 804. Display 802 may be part of an XR system (e.g., XR system 100 of FIG. 1 or XR system 200 of FIG. 2).

In scenario 800, the respective position of virtual hands 808 may be delayed relative to the respective positions of hands 804 based on characteristics of virtual object 806. For example, a hand tracker of the XR system may determine position data of hands 804, including one or more positions of hands 804 at one or more corresponding times. A rendering engine (e.g., rendering engine 302 of FIG. 3) of the XR system may render virtual hands 808 with respective positions that corresponds (e.g., within a field of view 110 of FIG. 1) with respective prior positions of hands 804.

The fact that virtual hands 808 are displayed delayed relative to hands 804, and an amount of the delay, may be based on characteristics of virtual object 806. For example, virtual object 806 may have a characteristics indicating that virtual object 806 is resistant to movement (e.g., rotation) or can no faster than a given speed. In such cases, virtual object 806, and virtual hands 808 interacting with virtual object 806 may be displayed moving more slowly than, or delayed relative to, hands 804. Displaying virtual hands 808 interacting with virtual object 806 according to the characteristics of virtual object 806 rather than corresponding in time to the movements of hands 804 may cause virtual object 806 and virtual hands 808 (and/or the interaction therebetween) to appear to be more real to the user.

The respective gestures of virtual hands 808 may, or may not, be based on characteristics of virtual object 806. In some cases, virtual object 806 have an interaction pose, for example, a grasp with palms facing toward the user. The XR system may interpret the pinch gestures of hands 804 as an intent to grab and/or hold virtual object 806. The XR system may initiate and maintain the grab and/or hold interaction allowing the user to virtually interact with virtual object 806. However, the rendering engine may display virtual hands 808 interacting with virtual object 806 according to the interaction pose of virtual object 806 and not according to the gestures of hands 804. Displaying virtual hands 808 interacting with virtual object 806 according to the interaction pose of virtual object 806 rather than the gestures of hands 804 may cause virtual object 806 and virtual hands 808 (and/or the interaction therebetween) to appear to be more real to the user.

FIG. 9 is a diagram illustrating an example scenario 900 including displaying virtual interactions, according to various aspects of the present disclosure. In scenario 900, a display 902 displays a virtual hand 908 interacting with a virtual object 906. The position and/or gesture of virtual hand 908 is based on characteristics of virtual object 906 and on a position and/or gesture of a hand 904. Display 902 may be part of an XR system (e.g., XR system 100 of FIG. 1 or XR system 200 of FIG. 2).

In scenario 900, the position of virtual hand 908 may be delayed relative to the position of hand 904 based on characteristics of virtual object 906. For example, a hand tracker of the XR system may determine position data of hand 904, including one or more positions of hand 904 at one or more corresponding times. A rendering engine (e.g., rendering engine 302 of FIG. 3) of the XR system may render virtual hand 908 with a position that corresponds (e.g., within a field of view 110 of FIG. 1) with a prior position of hand 904.

The gesture of virtual hand 908 may, or may not, be based on characteristics of virtual object 906. In some cases, virtual object 906 have an interaction pose, for example, a two-finger-plus-thumb grip of a bowling ball. The XR system may interpret the pinch gesture of hand 904 as an intent to grab and/or hold virtual object 906. The XR system may initiate and maintain the grab and/or hold interaction allowing the user to virtually interact with virtual object 906. However, the rendering engine may display virtual hand 908 interacting with virtual object 906 according to the interaction pose of virtual object 906 and not according to the gesture of hand 904.

In scenario 900, display 902 may display a shadow virtual hand 910. The position and/or gesture of shadow virtual hand 910 may correspond to the position and/or gesture of hand 904. Display 902 may display shadow virtual hand 910 as translucent. As an example, the hand tracker, having determined position data of hand 904, may provide the position data to the XR engine. The XR engine may render shadow virtual hand 910 as a representation (e.g., a translucent representation) of hand 904. The XR engine may provide data representative of shadow virtual hand 910 to display 902 and display 902 may display shadow virtual hand 910.

Displaying shadow virtual hand 910 to a user may indicate to the user the position of hand 904. In some case, the user may be unable to see hand 904 based on display 902 occluding a view of the user. Further, displaying shadow virtual hand 910 and virtual hand 908 to the user may indicate to the user a difference between the position of hand 904 and virtual hand 908 (e.g., based on characteristics of virtual object 906). Such an indication may provide a visual cue regarding the characteristics of virtual object 906, which may cause virtual object 906 and virtual hand 908 (and/or the interaction therebetween) to appear to be more real to the user. Additionally or alternatively, displaying shadow virtual hand 910 and virtual hand 908 to a user may indicate to the user that their gesture does not match the interaction pose of virtual object 906. Such an interaction may serve as a suggestion for the user to change their gesture to match the interaction pose of virtual object 906, which may (e.g., through proprioception) cause virtual object 906 and virtual hand 908 (and/or the interaction therebetween) to appear or feel more real to the user.

FIG. 10 is a diagram illustrating an example scenario 1000 including displaying virtual interactions, according to various aspects of the present disclosure. In scenario 1000, a display 1002 displays a virtual hand 1008 interacting with a virtual object 1006. The position and/or gesture of virtual hand 1008 is based on characteristics of virtual object 1006 and on a position and/or gesture of a hand 1004. Display 1002 may be part of an XR system (e.g., XR system 100 of FIG. 1 or XR system 200 of FIG. 2).

In scenario 1000, the position of virtual hand 1008 may correspond to the position of hand 1004. For example, a hand tracker of the XR system may determine position data of hand 1004. A rendering engine (e.g., rendering engine 302 of FIG. 3) of the XR system may render virtual hand 1008 with a position that corresponds (e.g., within a field of view 110 of FIG. 1) with the position of hand 1004. As hand 1004 moves, the hand tracker may track hand 1004 and update the position of hand 1004. The rendering engine may update the position of virtual hand 1008 to correspond with the updated position of hand 1004.

Additionally, in scenario 1000, the gesture of virtual hand 1008 may be based on characteristics of virtual object 1006 and may, or may not, correspond to the gesture of hand 1004. In the example of scenario 1000, virtual object 1006 have an interaction pose, for example, a grasp, with the palm facing toward the user. The XR system may interpret the pinch gesture of hand 1004 as an intent to grab and/or hold virtual object 1006. The XR system may initiate and maintain the grab and/or hold interaction allowing the user to virtually interact with virtual object 1006. However, the rendering engine may display virtual hand 1008 interacting with virtual object 1006 according to the interaction pose of virtual object 1006 and not according to the gesture of hand 1004. Displaying virtual hand 1008 interacting with virtual object 1006 according to the interaction pose of virtual object 1006 rather than the gesture of hand 1004 may cause virtual object 1006 and virtual hand 1008 (and/or the interaction therebetween) to appear to be more real to the user.

In scenario 1000, display 1002 may display a shadow virtual hand 1010. The position and/or gesture of shadow virtual hand 1010 may correspond to the position and/or gesture of hand 1004. Display 1002 may display shadow virtual hand 1010 as translucent. As an example, the hand tracker, having determined position data of hand 1004, may provide the position data to the XR engine. The XR engine may render shadow virtual hand 1010 as a representation (e.g., a translucent representation) of hand 1004. The XR engine may provide data representative of shadow virtual hand 1010 to display 1002 and display 1002 may display shadow virtual hand 1010. Displaying shadow virtual hand 1010 and virtual hand 1008 to a user may indicate to the user that their gesture does not match the interaction pose of virtual object 1006. Such an interaction may serve as a suggestion for the user to change their gesture to match the interaction pose of virtual object 1006, which may (e.g., through proprioception) cause virtual object 1006 and virtual hand 1008 (and/or the interaction therebetween) to appear or feel more real to the user.

Figure 11:
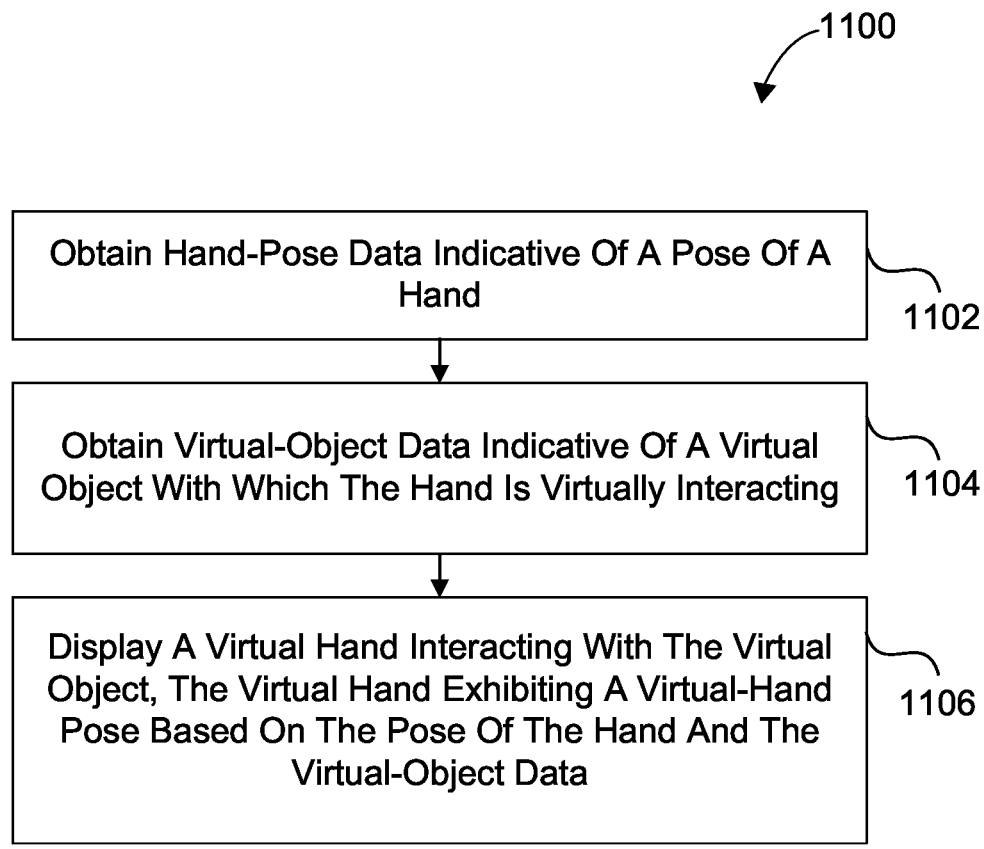
FIG. 11 is a flow diagram illustrating an example of a process for displaying virtual interactions between virtual hands and virtual objects, in accordance with aspects of the present disclosure.

FIG. 11 is a flow diagram illustrating a process 1100 for displaying virtual interactions between virtual hands and virtual objects, in accordance with aspects of the present disclosure. One or more operations of process 1100 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The one or more operations of process 1100 may be implemented as software components that are executed and run on one or more processors.

At block 1102, a computing device (or one or more components thereof) may obtain hand-pose data indicative of a pose of a hand. For example, rendering engine 302 of FIG. 3 may obtain hand-pose data 304 of FIG. 3.

In some aspects, the computing device (or one or more components thereof) may obtain one or more images of the hand; and determine, based on the one or more images of the hand, the hand-pose data, the hand-pose data comprising a position of the hand and a gesture of the hand. For example, the computing device (or one or more components thereof) may capture images of hand 404 of FIG. 4 and determine a position and/or gesture of hand 404 based on the captured images.

At block 1104, the computing device (or one or more components thereof) may obtain virtual-object data indicative of a virtual object with which the hand is virtually interacting. For example, rendering engine 302 may obtain virtual-object data 306 of FIG. 3.

In some aspects, the virtual-object data is based on characteristics of the virtual object; and the characteristics of the virtual object include one or more of: a size of the virtual object, a shape of the virtual object, a weight of the virtual object, a distance between the hand and the virtual object, or an interaction pose of the virtual object.

In some aspects, the pose of the hand may include a position of the hand and a gesture of the hand. The virtual-object data may include a position of the virtual object. The computing device (or one or more components thereof) may determine that the hand is virtually interacting with the virtual object based on a relationship between the position of the hand and the position of the virtual object and the gesture of the hand. For example, the computing device (or one or more components thereof) may determine that hand 404 is virtually interacting with virtual object 406 based on a position of hand 404 and a position of virtual object 406.

At block 1106, the computing device (or one or more components thereof) may display a virtual hand interacting with the virtual object, the virtual hand exhibiting a virtual-hand pose based on the pose of the hand and the virtual-object data. For example, rendering engine 302 may render virtual-hand-pose data 308 of FIG. 3 for displaying a virtual hand. For example, rendering engine 302 may render virtual-hand-pose data 308 which may be displayed by display 402 of FIG. 4. Virtual-hand-pose data 308 may include data to render virtual hand 408 of FIG. 4.

In some aspects, a gesture of the virtual hand may be different from a gesture of the hand. For example, a gesture of hand 404 of FIG. 4 may differ from a gesture of virtual hand 408. In some aspects, the gesture of the virtual hand may be based on an interaction pose of the virtual object indicated by the virtual-object data. For example, the gesture (e.g., grab) of virtual hand 408 may be based on an interaction pose of virtual object 406.

In some aspects, the pose of the hand may include a position of the hand and the gesture of the hand. The virtual-hand pose may include a position of the virtual hand and the gesture of the virtual hand. The position of the virtual hand may corresponds to the position of the hand and the gesture of the virtual hand is based on the virtual-object data. For example, the position of virtual hand 408 may correspond to the position of hand 404 and the gesture of virtual hand 408 may be based on virtual object 406 of FIG. 4.

In some aspects, the hand-pose data comprises first hand-pose data and the gesture of the hand comprises a first gesture; the pose of the hand comprises a first pose of the hand comprising the first gesture of the hand; the virtual-object data comprises first virtual-object data; the virtual object comprises a first virtual object; the virtual-hand pose comprises a first virtual hand pose; and the computing device (or one or more components thereof) may: obtain second hand-pose data indicative of a second pose of the hand, the second pose of the hand comprising a second gesture of the hand that is the same as the first gesture of the hand; obtain second virtual-object data indicative of a second virtual object with which the hand is virtually interacting, the second virtual-object data being different than the first virtual-object data; and display the virtual hand interacting with the second virtual object, the virtual hand exhibiting a second virtual-hand pose, the second virtual-hand pose different from the first virtual hand pose based on the second virtual-object data being different than the first virtual-object data. For example, the gesture of virtual hands 508 of FIG. 5 may differ from the gesture of virtual hands 608 of FIG. 6 based on virtual object 506 of FIG. 5 being different from virtual object 606 of FIG. 6 (e.g., virtual object 506 and virtual object 606 may have different interaction poses).

In some aspects, the pose of the hand comprises a position of the hand; the virtual-hand pose comprises a position of the virtual hand; and the position of the virtual hand is delayed relative to the position of the hand based on the virtual-object data. For example, the position of virtual hand 708 of FIG. 7 may be delayed relative to the position of hand 704 of FIG. 7. In some aspects, the position of the virtual hand may be delayed relative to the position of the hand based on a weight of the virtual object indicated by the virtual-object data. For example, the position of virtual hand 708 may be delayed relative to hand 704 based on a weight of virtual object 706. In some aspects, the computing device (or one or more components thereof) may display a shadow virtual hand exhibiting a shadow-virtual-hand pose, the shadow-virtual-hand pose comprising a position of the shadow virtual hand, the position of the shadow virtual hand corresponding to the position of the hand. For example, a position of shadow virtual hand 910 of FIG. 9 may correspond to a position of hand 904 of FIG. 9.

In some aspects, the computing device (or one or more components thereof) may display a shadow virtual hand exhibiting a shadow-virtual-hand pose, the shadow-virtual-hand pose corresponding to the pose of the hand. For example, the position of shadow virtual hand 910 of FIG. 9 may correspond to the position of hand 904 of FIG. 9. In some aspects, the computing device (or one or more components thereof) may display the shadow virtual hand as translucent. For example, shadow virtual hand 910 may be displayed as translucent.

In some aspects, the computing device (or one or more components thereof) may display a shadow virtual hand exhibiting a shadow-virtual-hand pose. The shadow-virtual-hand pose may include a position of the shadow virtual hand and a gesture of the shadow virtual hand. The position of the shadow virtual hand may corresponding to the position of the hand and the gesture of the shadow virtual hand may correspond to the gesture of the hand. For example, the position of shadow virtual hand 910 of FIG. 9 may correspond to the position of hand 904 of FIG. 9 and the gesture of shadow virtual hand 910 may correspond to the gesture of hand 904.

Figure 12:
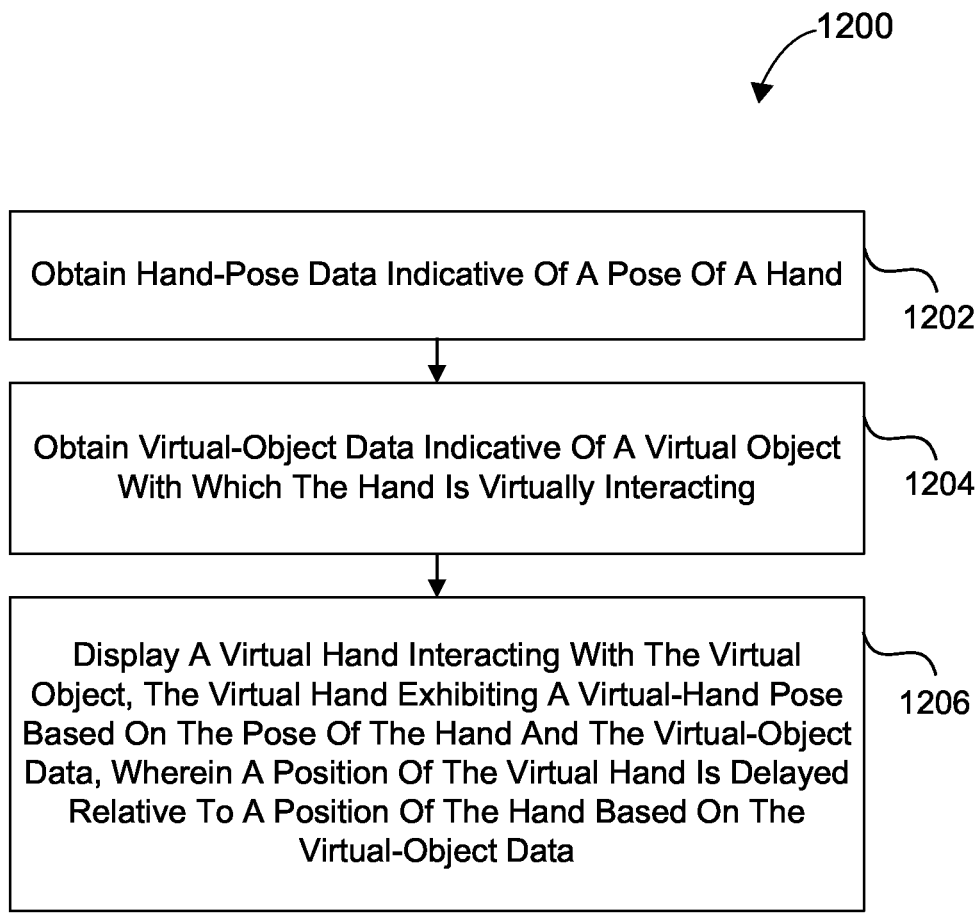
FIG. 12 is a flow diagram illustrating another example of a process for displaying virtual interactions between virtual hands and virtual objects, in accordance with aspects of the present disclosure.

FIG. 12 is a flow diagram illustrating a process 1200 for displaying virtual interactions between virtual hands and virtual objects, in accordance with aspects of the present disclosure. One or more operations of process 1200 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The one or more operations of process 1200 may be implemented as software components that are executed and run on one or more processors.

At block 1202, a computing device (or one or more components thereof) may obtain hand-pose data indicative of a pose of a hand. For example, rendering engine 302 of FIG. 3 may obtain hand-pose data 304 of FIG. 3.

At block 1204, the computing device (or one or more components thereof) may obtain virtual-object data indicative of a virtual object with which the hand is virtually interacting. For example, rendering engine 302 may obtain virtual-object data 306 of FIG. 3.

At block 1206, the computing device (or one or more components thereof) may display a virtual hand interacting with the virtual object, the virtual hand exhibiting a virtual-hand pose based on the pose of the hand and the virtual-object data, wherein a position of the virtual hand is delayed relative to a position of the hand based on the virtual-object data.

For example, rendering engine 302 may render virtual-hand-pose data 308 of FIG. 3 for displaying a virtual hand. For example, rendering engine 302 may render virtual-hand-pose data 308 which may be displayed by display 702 of FIG. 7. Virtual-hand-pose data 308 may include data to render virtual hand 708 of FIG. 7. The position of virtual hand 708 of FIG. 7 may be delayed relative to the position of hand 704 of FIG. 7.

In some examples, the methods described herein (e.g., process 1100 of FIG. 11, process 1200 of FIG. 12 and/or other methods described herein) can be performed, in whole or in part, by a computing device or apparatus. In one example, one or more of the methods can be performed by XR system 100 of FIG. 1, XR device 102 of FIG. 1, companion device 104 of FIG. 1, XR system 200 of FIG. 2, compute components 214 of FIG. 2, display 212 of FIG. 2, system 300 of FIG. 3, rendering engine 302 of FIG. 3, or by another system or device. In another example, one or more of the methods can be performed, in whole or in part, by the computing-device architecture 1300 shown in FIG. 13. For instance, a computing device with the computing-device architecture 1300 shown in FIG. 13 can include, or be included in, the components of XR system 100 of FIG. 1, XR device 102 of FIG. 1, companion device 104 of FIG. 1, XR system 200 of FIG. 2, compute components 214 of FIG. 2, display 212 of FIG. 2, system 300 of FIG. 3, rendering engine 302 of FIG. 3, and can implement the operations of process 1100, process 1200, and/or other process described herein.

The computing device can include any suitable device, such as a vehicle or a computing device of a vehicle, a mobile device (e.g., a mobile phone), a desktop computing device, a tablet computing device, a wearable device (e.g., a VR headset, an AR headset, AR glasses, a network-connected watch or smartwatch, or other wearable device), a server computer, a robotic device, a television, and/or any other computing device with the resource capabilities to perform the processes described herein, including, process 1100, process 1200, and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 1100, process 1200, and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 1100, process 1200, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

Figure 13:
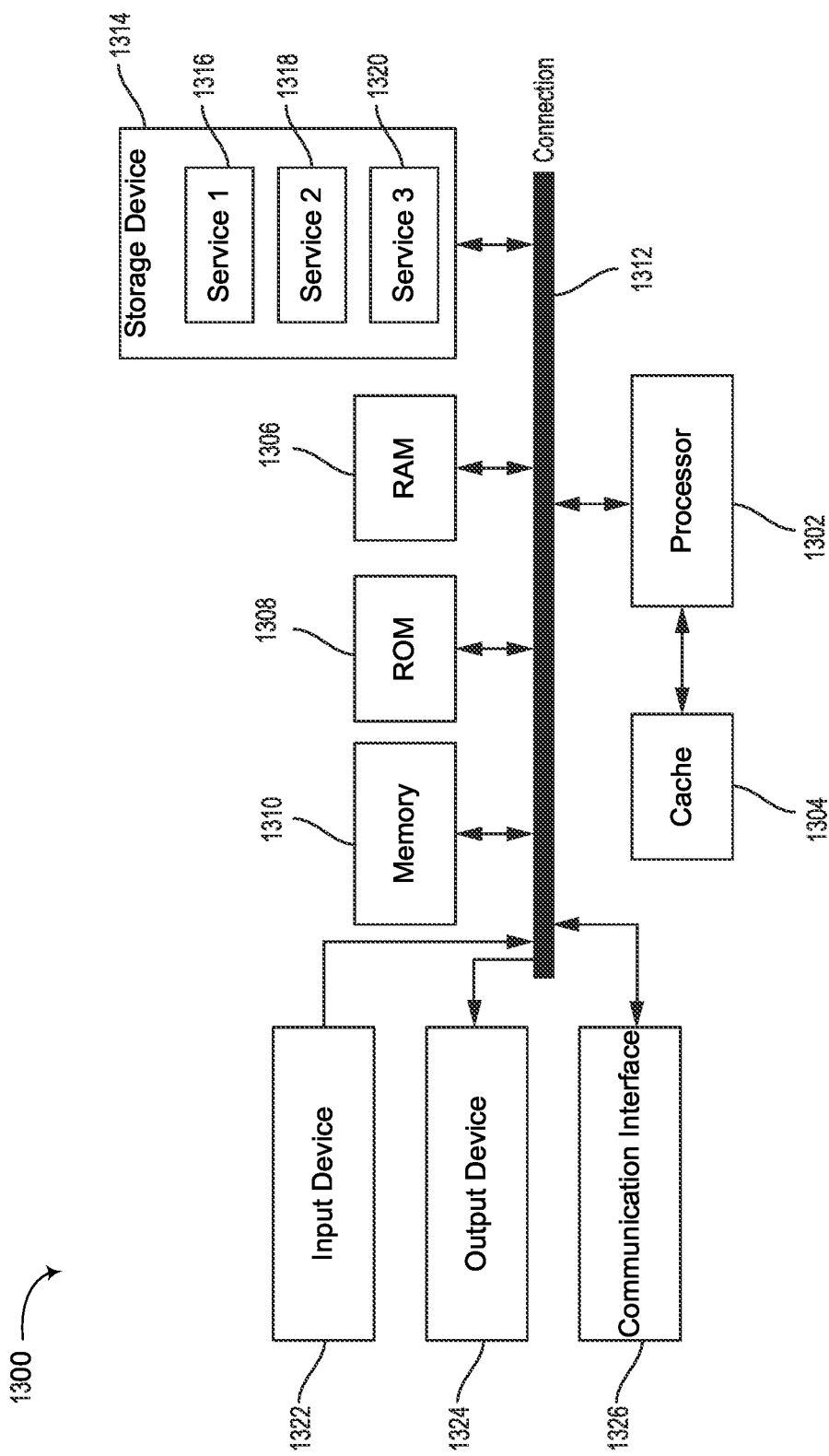
FIG. 13 illustrates an example computing-device architecture of an example computing device which can implement the various techniques described herein.

FIG. 13 illustrates an example computing-device architecture 1300 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 1300 may include, implement, or be included in any or all of XR system 100 of FIG. 1, XR device 102 of FIG. 1, companion device 104 of FIG. 1, XR system 200 of FIG. 2, compute components 214 of FIG. 2, display 212 of FIG. 2, system 300 of FIG. 3, rendering engine 302 of FIG. 3.

The components of computing-device architecture 1300 are shown in electrical communication with each other using connection 1312, such as a bus. The example computing-device architecture 1300 includes a processing unit (CPU or processor) 1302 and computing device connection 1312 that couples various computing device components including computing device memory 1310, such as read only memory (ROM) 1308 and random-access memory (RAM) 1306, to processor 1302.

Computing-device architecture 1300 can include a cache of high-speed memory connected directly with, in close proximity to, or integrated as part of processor 1302. Computing-device architecture 1300 can copy data from memory 1310 and/or the storage device 1314 to cache 1304 for quick access by processor 1302. In this way, the cache can provide a performance boost that avoids processor 1302 delays while waiting for data. These and other modules can control or be configured to control processor 1302 to perform various actions. Other computing device memory 1310 may be available for use as well. Memory 1310 can include multiple different types of memory with different performance characteristics. Processor 1302 can include any general-purpose processor and a hardware or software service, such as service 1 1316, service 2 1318, and service 3 1320 stored in storage device 1314, configured to control processor 1302 as well as a special-purpose processor where software instructions are incorporated into the processor design. Processor 1302 may be a self-contained system, containing multiple cores or processors, a bus, memory controller, cache, etc. A multi-core processor may be symmetric or asymmetric.

To enable user interaction with the computing-device architecture 1300, input device 1322 can represent any number of input mechanisms, such as a microphone for speech, a touch-sensitive screen for gesture or graphical input, keyboard, mouse, motion input, speech and so forth. Output device 1324 can also be one or more of a number of output mechanisms known to those of skill in the art, such as a display, projector, television, speaker device, etc. In some instances, multimodal computing devices can enable a user to provide multiple types of input to communicate with computing-device architecture 1300. Communication interface 1326 can generally govern and manage the user input and computing device output. There is no restriction on operating on any particular hardware arrangement and therefore the basic features here may easily be substituted for improved hardware or firmware arrangements as they are developed.

Storage device 1314 is a non-volatile memory and can be a hard disk or other types of computer readable media which can store data that are accessible by a computer, such as magnetic cassettes, flash memory cards, solid state memory devices, digital versatile disks, cartridges, random-access memories (RAMs) 1306, read only memory (ROM) 1308, and hybrids thereof. Storage device 1314 can include services 1316, 1318, and 1320 for controlling processor 1302. Other hardware or software modules are contemplated. Storage device 1314 can be connected to the computing device connection 1312. In one aspect, a hardware module that performs a particular function can include the software component stored in a computer-readable medium in connection with the necessary hardware components, such as processor 1302, connection 1312, output device 1324, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors, and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for displaying one or more virtual objects, the apparatus comprising: at least one memory; and at least one processor coupled to the at least one memory and configured to: obtain hand-pose data indicative of a pose of a hand; obtain virtual-object data indicative of a virtual object with which the hand is virtually interacting; and display a virtual hand interacting with the virtual object, the virtual hand exhibiting a virtual-hand pose based on the pose of the hand and the virtual-object data.

Aspect 2. The apparatus of aspect 1, wherein a gesture of the virtual hand is different from a gesture of the hand.

Aspect 3. The apparatus of any one of aspects 1 or 2, wherein: the pose of the hand comprises a position of the hand and the gesture of the hand; the virtual-hand pose comprises a position of the virtual hand and the gesture of the virtual hand; the position of the virtual hand corresponds to the position of the hand; and the gesture of the virtual hand is based on the virtual-object data.

Aspect 4. The apparatus of aspect 3, wherein the at least one processor is further configured to display a shadow virtual hand exhibiting a shadow-virtual-hand pose, the shadow-virtual-hand pose comprising a position of the shadow virtual hand and a gesture of the shadow virtual hand, the position of the shadow virtual hand corresponding to the position of the hand and the gesture of the shadow virtual hand corresponding to the gesture of the hand.

Aspect 5. The apparatus of any one of aspects 1 to 4, wherein the gesture of the virtual hand is based on an interaction pose of the virtual object indicated by the virtual-object data.

Aspect 6. The apparatus of any one of aspects 1 to 5, wherein: the hand-pose data comprises first hand-pose data and the gesture of the hand comprises a first gesture; the pose of the hand comprises a first pose of the hand comprising the first gesture of the hand; the virtual-object data comprises first virtual-object data; the virtual object comprises a first virtual object; the virtual-hand pose comprises a first virtual hand pose; and the at least one processor is further configured to: obtain second hand-pose data indicative of a second pose of the hand, the second pose of the hand comprising a second gesture of the hand that is the same as the first gesture of the hand; obtain second virtual-object data indicative of a second virtual object with which the hand is virtually interacting, the second virtual-object data being different than the first virtual-object data; and display the virtual hand interacting with the second virtual object, the virtual hand exhibiting a second virtual-hand pose, the second virtual-hand pose different from the first virtual hand pose based on the second virtual-object data being different than the first virtual-object data.

Aspect 7. The apparatus of any one of aspects 1 to 6, wherein: the pose of the hand comprises a position of the hand; the virtual-hand pose comprises a position of the virtual hand; and the position of the virtual hand is delayed relative to the position of the hand based on the virtual-object data.

Aspect 8. The apparatus of aspect 7, wherein the position of the virtual hand is delayed relative to the position of the hand based on a weight of the virtual object indicated by the virtual-object data.

Aspect 9. The apparatus of any one of aspects 7 or 8, wherein the at least one processor is further configured to display a shadow virtual hand exhibiting a shadow-virtual-hand pose, the shadow-virtual-hand pose comprising a position of the shadow virtual hand, the position of the shadow virtual hand corresponding to the position of the hand.

Aspect 10. The apparatus of any one of aspects 1 to 9, wherein the virtual-hand pose is different from the pose of the hand.

Aspect 11. The apparatus of any one of aspects 1 to 10, wherein: the virtual-object data is based on characteristics of the virtual object; and the characteristics of the virtual object include one or more of: a size of the virtual object, a shape of the virtual object, a weight of the virtual object, a distance between the hand and the virtual object, or an interaction pose of the virtual object.

Aspect 12. The apparatus of any one of aspects 1 to 11, wherein the at least one processor is further configured to display a shadow virtual hand exhibiting a shadow-virtual-hand pose, the shadow-virtual-hand pose corresponding to the pose of the hand.

Aspect 13. The apparatus of aspect 12, wherein to display the shadow virtual hand the at least one processor is further configured to display the shadow virtual hand as translucent.

Aspect 14. The apparatus of any one of aspects 1 to 13, wherein the at least one processor is further configured to: obtain one or more images of the hand; and determine, based on the one or more images of the hand, the hand-pose data, the hand-pose data comprising a position of the hand and a gesture of the hand.

Aspect 15. The apparatus of any one of aspects 1 to 14, wherein: the pose of the hand comprises a position of the hand and a gesture of the hand; the virtual-object data comprises a position of the virtual object; and the at least one processor is further configured to determine that the hand is virtually interacting with the virtual object based on a relationship between the position of the hand and the position of the virtual object and the gesture of the hand.

Aspect 16. An apparatus for displaying one or more virtual objects, the apparatus comprising: at least one memory; and at least one processor coupled to the at least one memory and configured to: obtain hand-pose data indicative of a pose of a hand; obtain virtual-object data indicative of a virtual object with which the hand is virtually interacting; and display a virtual hand interacting with the virtual object, the virtual hand exhibiting a virtual-hand pose based on the pose of the hand and the virtual-object data, wherein a position of the virtual hand is delayed relative to a position of the hand based on the virtual-object data.

Aspect 17. A method for displaying one or more virtual objects, the method comprising: obtaining hand-pose data indicative of a pose of a hand; obtaining virtual-object data indicative of a virtual object with which the hand is virtually interacting; and displaying a virtual hand interacting with the virtual object, the virtual hand exhibiting a virtual-hand pose based on the pose of the hand and the virtual-object data.

Aspect 18. The method of aspect 17, wherein a gesture of the virtual hand is different from a gesture of the hand.

Aspect 19. The method of any one of aspects 17 or 18, wherein: the pose of the hand comprises a position of the hand and the gesture of the hand; the virtual-hand pose comprises a position of the virtual hand and the gesture of the virtual hand; the position of the virtual hand corresponds to the position of the hand; and the gesture of the virtual hand is based on the virtual-object data.

Aspect 20. The method of aspect 19, further comprising displaying a shadow virtual hand exhibiting a shadow-virtual-hand pose, the shadow-virtual-hand pose comprising a position of the shadow virtual hand and a gesture of the shadow virtual hand, the position of the shadow virtual hand corresponding to the position of the hand and the gesture of the shadow virtual hand corresponding to the gesture of the hand.

Aspect 21. The method of any one of aspects 17 to 20, wherein the gesture of the virtual hand is based on an interaction pose of the virtual object indicated by the virtual-object data.

Aspect 22. The method of any one of aspects 17 to 21, wherein: the hand-pose data comprises first hand-pose data and the gesture of the hand comprises a first gesture; the pose of the hand comprises a first pose of the hand comprising the first gesture of the hand; the virtual-object data comprises first virtual-object data; the virtual object comprises a first virtual object; the virtual-hand pose comprises a first virtual hand pose; and the method further comprises: obtaining second hand-pose data indicative of a second pose of the hand, the second pose of the hand comprising a second gesture of the hand that is the same as the first gesture of the hand; obtaining second virtual-object data indicative of a second virtual object with which the hand is virtually interacting, the second virtual-object data being different than the first virtual-object data; and displaying the virtual hand interacting with the second virtual object, the virtual hand exhibiting a second virtual-hand pose, the second virtual-hand pose different from the first virtual hand pose based on the second virtual-object data being different than the first virtual-object data.

Aspect 23. The method of any one of aspects 17 to 22, wherein: the pose of the hand comprises a position of the hand; the virtual-hand pose comprises a position of the virtual hand; and the position of the virtual hand is delayed relative to the position of the hand based on the virtual-object data.

Aspect 24. The method of aspect 23, wherein the position of the virtual hand is delayed relative to the position of the hand based on a weight of the virtual object indicated by the virtual-object data.

Aspect 25. The method of any one of aspects 23 or 24, further comprising displaying a shadow virtual hand exhibiting a shadow-virtual-hand pose, the shadow-virtual-hand pose comprising a position of the shadow virtual hand, the position of the shadow virtual hand corresponding to the position of the hand.

Aspect 26. The method of any one of aspects 17 to 25, wherein the virtual-hand pose is different from the pose of the hand.

Aspect 27. The method of any one of aspects 17 to 26, wherein: the virtual-object data is based on characteristics of the virtual object; and the characteristics of the virtual object include one or more of: a size of the virtual object, a shape of the virtual object, a weight of the virtual object, a distance between the hand and the virtual object, or an interaction pose of the virtual object.

Aspect 28. The method of any one of aspects 17 to 27, further comprising displaying a shadow virtual hand exhibiting a shadow-virtual-hand pose, the shadow-virtual-hand pose corresponding to the pose of the hand.

Aspect 29. The method of any one of aspects 17 to 28, wherein displaying the shadow virtual hand comprises displaying the shadow virtual hand as translucent.

Aspect 30. The method of any one of aspects 17 to 29, further comprising: obtaining one or more images of the hand; and determining, based on the one or more images of the hand, the hand-pose data, the hand-pose data comprising a position of the hand and a gesture of the hand.

Aspect 31. The method of any one of aspects 17 to 30, wherein: the pose of the hand comprises a position of the hand and a gesture of the hand; the virtual-object data comprises a position of the virtual object; and the method further comprises determining that the hand is virtually interacting with the virtual object based on a relationship between the position of the hand and the position of the virtual object and the gesture of the hand.

Aspect 32. A method for displaying one or more virtual objects, the method comprising: obtaining hand-pose data indicative of a pose of a hand; obtaining virtual-object data indicative of a virtual object with which the hand is virtually interacting; and displaying a virtual hand interacting with the virtual object, the virtual hand exhibiting a virtual-hand pose based on the pose of the hand and the virtual-object data, wherein a position of the virtual hand is delayed relative to a position of the hand based on the virtual-object data.

Aspect 33. A non-transitory computer-readable storage medium having stored thereon instructions that, when executed by at least one processor, cause the at least one processor to perform operations according to any of aspects 17 to 32.

Aspect 34. An apparatus for providing virtual content for display, the apparatus comprising one or more means for perform operations according to any of aspects 17 to 32.

What is claimed is:

1. An apparatus for displaying one or more virtual objects, the apparatus comprising:
at least one memory; and
at least one processor coupled to the at least one memory and configured to:
obtain hand-pose data indicative of a pose of a hand, wherein the pose of the hand comprises a position of the hand and a gesture of the hand;
obtain virtual-object data indicative of a virtual object with which the hand is virtually interacting; and
display a virtual hand interacting with the virtual object, the virtual hand exhibiting a virtual-hand pose based on the pose of the hand and the virtual-object data, wherein the virtual-hand pose comprises a position of the virtual hand and a gesture of the virtual hand, wherein the position of the virtual hand corresponds to the position of the hand, wherein the gesture of the virtual hand is based on the virtual-object data, and wherein the gesture of the virtual hand is different from the gesture of the hand.

2. The apparatus of claim 1, wherein the at least one processor is further configured to display a shadow virtual hand exhibiting a shadow-virtual-hand pose, the shadow-virtual-hand pose comprising a position of the shadow virtual hand and a gesture of the shadow virtual hand, the position of the shadow virtual hand corresponding to the position of the hand and the gesture of the shadow virtual hand corresponding to the gesture of the hand.

3. The apparatus of claim 1, wherein the gesture of the virtual hand is based on an interaction pose of the virtual object indicated by the virtual-object data.

4. The apparatus of claim 1, wherein:
the hand-pose data comprises first hand-pose data and the gesture of the hand comprises a first gesture;
the pose of the hand comprises a first pose of the hand comprising the first gesture of the hand;
the virtual-object data comprises first virtual-object data;
the virtual object comprises a first virtual object;
the virtual-hand pose comprises a first virtual hand pose; and
the at least one processor is further configured to:
obtain second hand-pose data indicative of a second pose of the hand, the second pose of the hand comprising a second gesture of the hand that is the same as the first gesture of the hand;
obtain second virtual-object data indicative of a second virtual object with which the hand is virtually interacting, the second virtual-object data being different than the first virtual-object data; and
display the virtual hand interacting with the second virtual object, the virtual hand exhibiting a second virtual-hand pose, the second virtual-hand pose different from the first virtual hand pose based on the second virtual-object data being different than the first virtual-object data.

5. The apparatus of claim 1, wherein:
the pose of the hand comprises a position of the hand;
the virtual-hand pose comprises a position of the virtual hand; and
the position of the virtual hand is delayed relative to the position of the hand based on the virtual-object data.

6. The apparatus of claim 5, wherein the position of the virtual hand is delayed relative to the position of the hand based on a weight of the virtual object indicated by the virtual-object data.

7. The apparatus of claim 5, wherein the at least one processor is further configured to display a shadow virtual hand exhibiting a shadow-virtual-hand pose, the shadow-virtual-hand pose comprising a position of the shadow virtual hand, the position of the shadow virtual hand corresponding to the position of the hand.

8. The apparatus of claim 1, wherein the virtual-hand pose is different from the pose of the hand.

9. The apparatus of claim 1, wherein:
the virtual-object data is based on characteristics of the virtual object; and
the characteristics of the virtual object include one or more of: a size of the virtual object, a shape of the virtual object, a weight of the virtual object, a distance between the hand and the virtual object, or an interaction pose of the virtual object.

10. The apparatus of claim 1, wherein the at least one processor is further configured to display a shadow virtual hand exhibiting a shadow-virtual-hand pose, the shadow-virtual-hand pose corresponding to the pose of the hand.

11. The apparatus of claim 10, wherein to display the shadow virtual hand the at least one processor is further configured to display the shadow virtual hand as translucent.

12. The apparatus of claim 1, wherein the at least one processor is further configured to:
obtain one or more images of the hand; and
determine, based on the one or more images of the hand, the hand-pose data, the hand-pose data comprising a position of the hand and a gesture of the hand.

13. The apparatus of claim 1, wherein:
the pose of the hand comprises a position of the hand and a gesture of the hand;
the virtual-object data comprises a position of the virtual object; and
the at least one processor is further configured to determine that the hand is virtually interacting with the virtual object based on a relationship between the position of the hand and the position of the virtual object and the gesture of the hand.

14. An apparatus for displaying one or more virtual objects, the apparatus comprising:
at least one memory; and
at least one processor coupled to the at least one memory and configured to:
obtain hand-pose data indicative of a pose of a hand, wherein the pose of the hand comprises a position of the hand and a gesture of the hand;
obtain virtual-object data indicative of a virtual object with which the hand is virtually interacting; and
display a virtual hand interacting with the virtual object, the virtual hand exhibiting a virtual-hand pose based on the pose of the hand and the virtual-object data, wherein the virtual-hand pose comprises a position of the virtual hand and a gesture of the virtual hand, wherein the position of the virtual hand is delayed relative to a position of the hand based on the virtual-object data, wherein the gesture of the virtual hand is based on the virtual-object data, and wherein the gesture of the virtual hand is different from the gesture of the hand.

15. A method for displaying one or more virtual objects, the method comprising:
obtaining hand-pose data indicative of a pose of a hand, wherein the pose of the hand comprises a position of the hand and a gesture of the hand;
obtaining virtual-object data indicative of a virtual object with which the hand is virtually interacting; and
displaying a virtual hand interacting with the virtual object, the virtual hand exhibiting a virtual-hand pose based on the pose of the hand and the virtual-object data, wherein the virtual-hand pose comprises a position of the virtual hand and a gesture of the virtual hand, wherein the position of the virtual hand corresponds to the position of the hand, wherein the gesture of the virtual hand is based on the virtual-object data, and wherein the gesture of the virtual hand is different from the gesture of the hand.

16. The method of claim 15, further comprising displaying a shadow virtual hand exhibiting a shadow-virtual-hand pose, the shadow-virtual-hand pose comprising a position of the shadow virtual hand and a gesture of the shadow virtual hand, the position of the shadow virtual hand corresponding to the position of the hand and the gesture of the shadow virtual hand corresponding to the gesture of the hand.

17. The method of claim 15, wherein the gesture of the virtual hand is based on an interaction pose of the virtual object indicated by the virtual-object data.

18. The method of claim 15, wherein:
the hand-pose data comprises first hand-pose data and the gesture of the hand comprises a first gesture;
the pose of the hand comprises a first pose of the hand comprising the first gesture of the hand;
the virtual-object data comprises first virtual-object data;
the virtual object comprises a first virtual object;
the virtual-hand pose comprises a first virtual hand pose; and
the method further comprises:
obtaining second hand-pose data indicative of a second pose of the hand, the second pose of the hand comprising a second gesture of the hand that is the same as the first gesture of the hand;
obtaining second virtual-object data indicative of a second virtual object with which the hand is virtually interacting, the second virtual-object data being different than the first virtual-object data; and
displaying the virtual hand interacting with the second virtual object, the virtual hand exhibiting a second virtual-hand pose, the second virtual-hand pose different from the first virtual hand pose based on the second virtual-object data being different than the first virtual-object data.

19. The method of claim 15, wherein:
the pose of the hand comprises a position of the hand;
the virtual-hand pose comprises a position of the virtual hand; and
the position of the virtual hand is delayed relative to the position of the hand based on the virtual-object data.

20. The method of claim 19, wherein the position of the virtual hand is delayed relative to the position of the hand based on a weight of the virtual object indicated by the virtual-object data.

21. The method of claim 19, further comprising displaying a shadow virtual hand exhibiting a shadow-virtual-hand pose, the shadow-virtual-hand pose comprising a position of the shadow virtual hand, the position of the shadow virtual hand corresponding to the position of the hand.

22. The method of claim 15, wherein the virtual-hand pose is different from the pose of the hand.

23. The method of claim 15, wherein:
the virtual-object data is based on characteristics of the virtual object; and
the characteristics of the virtual object include one or more of: a size of the virtual object, a shape of the virtual object, a weight of the virtual object, a distance between the hand and the virtual object, or an interaction pose of the virtual object.

24. The method of claim 15, further comprising displaying a shadow virtual hand exhibiting a shadow-virtual-hand pose, the shadow-virtual-hand pose corresponding to the pose of the hand.

25. The method of claim 24, wherein displaying the shadow virtual hand comprises displaying the shadow virtual hand as translucent.

26. A method for displaying one or more virtual objects, the method comprising:
obtaining hand-pose data indicative of a pose of a hand, wherein the pose of the hand comprises a position of the hand and a gesture of the hand;
obtaining virtual-object data indicative of a virtual object with which the hand is virtually interacting; and
displaying a virtual hand interacting with the virtual object, the virtual hand exhibiting a virtual-hand pose based on the pose of the hand and the virtual-object data, wherein the virtual-hand pose comprises a position of the virtual hand and a gesture of the virtual hand, wherein the position of the virtual hand is delayed relative to a position of the hand based on the virtual-object data, wherein the gesture of the virtual hand is based on the virtual-object data, and wherein the gesture of the virtual hand is different from the gesture of the hand.

\* \* \* \* \*